US010829861B2

(12) United States Patent
Tamura et al.

(10) Patent No.: US 10,829,861 B2
(45) Date of Patent: Nov. 10, 2020

(54) REDUCTION CATALYST, AND CHEMICAL REACTOR, REDUCTION METHOD AND REDUCTION PRODUCT-PRODUCING SYSTEM EMPLOYING THE CATALYST

(71) Applicant: KABUSHIKI KAISHA TOSHIBA, Minato-ku (JP)

(72) Inventors: Jun Tamura, Chuo (JP); Satoshi Mikoshiba, Yamato (JP); Yuki Kudo, Yokohama (JP); Akihiko Ono, Kita (JP); Ryota Kitagawa, Setagaya (JP); Masakazu Yamagiwa, Yokohama (JP); Yoshitsune Sugano, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/690,610

(22) Filed: Aug. 30, 2017

(65) Prior Publication Data
US 2018/0209053 A1 Jul. 26, 2018

(30) Foreign Application Priority Data
Jan. 25, 2017 (JP) .................................. 2017-011523

(51) Int. Cl.
| C25B 11/04 | (2006.01) |
| C25B 1/22 | (2006.01) |
| C25B 3/04 | (2006.01) |
| C25B 9/00 | (2006.01) |
| B01J 31/02 | (2006.01) |
| C25B 1/00 | (2006.01) |
| C25B 9/08 | (2006.01) |
| B01J 31/16 | (2006.01) |

(52) U.S. Cl.
CPC ....... *C25B 11/0447* (2013.01); *B01J 31/0228* (2013.01); *B01J 31/0238* (2013.01); *B01J 31/0244* (2013.01); *B01J 31/0271* (2013.01); *B01J 31/1625* (2013.01); *C25B 1/003* (2013.01); *C25B 1/22* (2013.01); *C25B 3/04* (2013.01); *C25B 9/00* (2013.01); *C25B 9/08* (2013.01); *B01J 2231/625* (2013.01); *C25B 11/0489* (2013.01)

(58) Field of Classification Search
CPC ............... B01J 31/0228; B01J 31/0238; B01J 31/0244; B01J 31/0271; B01J 31/1625; B01J 2231/625; C25B 1/003; C25B 1/22; C25B 3/04; C25B 9/00; C25B 9/08; C25B 11/0447; C25B 11/0489
See application file for complete search history.

(56) References Cited

U.S. PATENT DOCUMENTS

| 4,981,828 A | * | 1/1991 | Takahashi | ................ B01J 23/88 502/168 |
| 2009/0009756 A1 | * | 1/2009 | Yamamichi | ............ G01N 21/05 356/246 |
| 2010/0209814 A1 | | 8/2010 | Suzuki et al. | |
| 2011/0237830 A1 | | 9/2011 | Masel | |
| 2012/0277465 A1 | | 11/2012 | Cole et al. | |
| 2016/0076158 A1 | | 3/2016 | Tamura et al. | |
| 2016/0376717 A1 | | 12/2016 | Tamura et al. | |
| 2017/0073827 A1 | | 3/2017 | Tamura et al. | |
| 2017/0369405 A1 | | 12/2017 | Tamura et al. | |

FOREIGN PATENT DOCUMENTS

| EP | 3 006 604 A1 | 4/2016 |
| JP | 2000-144466 | 5/2000 |
| JP | 2010-188243 | 9/2010 |
| JP | 2013-538285 | 10/2013 |
| JP | 2014-518335 | 7/2014 |
| JP | 2015-132012 | 7/2015 |
| JP | 2015-175020 | 10/2015 |
| JP | 2015-210096 | 11/2015 |
| JP | 2016-215141 | 12/2016 |
| JP | 2017-057491 | 3/2017 |
| WO | WO2014/192891 A1 * | 12/2014 |
| WO | WO 2016/186005 A1 | 11/2016 |

OTHER PUBLICATIONS

Chah, S., Hutter, E., Roy, D., Fendler, J.H., Yi, J.—The effect of substrate metal on 2-aminoethanethiol and nanoparticle enhanced surface plasmom resonance imaging, Chemical Physics, 272 (2001), pp. 127-136 (Year: 2001).*
Nanjo, S., Ishii, K., Ueki, T., Imabayashi, S., Watanabe, M., Kano, K.—Electron Transfer Reactions of Glucose Oxidase at Au(111) Electrodes Modified with Phenothiazine Derivatives, Analytical Chemistry, vol. 77, No. 13, Jul. 1, 2005, pp. 4142-4147 (Year: 2005).*
Sato, S., Namba, K., Hara, K., Fukuoka, A., Murakoshi, K., Uosaki, K., Ikeda, K.—Kinetic Behavior of Catalytic Active Sites Connected with a Conducting Surface through Various Electronic Coupling, J. Phys. Chem. C 2016, 120, 4, pp. 215-2165 (Year: 2015).*
Kato, M., Oyaizu, N., Shimazu, K., Yagi, I.—Oxygen Reduction Reaction Catalyzed by Self-Assembled Monolayers of Copper-Based Electrocatalysts on a Polycrystalline Gold Surface, J. Phys. Chem. C 2016, 120, 4, pp. 15814-15822 (Year: 2016).*
Shin, H., Kang, C.—A Catalytic 2-Aminoethanethiol Reduction on a Gold Electrode through a Sulfur-Gold Bond Formation, Bull. Korean Chem.Soc. 2005, col. 26, No. 3, pp. 493-495 (Year: 2005).*

(Continued)

*Primary Examiner* — Anca Eoff
(74) *Attorney, Agent, or Firm* — Oblon, McClelland, Maier & Neustadt, L.L.P.

(57) ABSTRACT

The present embodiments provide a reduction catalyst realizing high reaction efficiency and a reduction reactor employing the catalyst. The reduction catalyst of the embodiment comprises an electric conductor and an organic layer having organic modifying groups placed on the surface of the conductor. The organic modifying groups have an aromatic ring having two or more nitrogen atoms. The reduction catalyst is used in a reduction reactor, and the reactor is also provided.

14 Claims, 5 Drawing Sheets

(56) References Cited

OTHER PUBLICATIONS

Bang Sook Lee, et al., "Imidazolium Ion-Terminated Self-Assembled Monolayers on Au: Effects of Counteranions on Surface Wettability,"2004, J. Am. Chem. Soc., vol. 126, No. 2, pp. 480-481.
Seongpil Hwang, et al., "Faradaic impedance titration and control of electron transfer of 1-(12-mercaptododecyl) imidazole monolayer on a gold electrode," 2008, Electrochimica Acta 53, pp. 2630-2636.
Yu Sun, et al., "Photoelectrochemical Reduction of Carbon Dioxide at Si (111) Electrode Modified by Viologen Molecular Layer with Metal Complex," 2012, Chem Lett. vol. 41, pp. 328-330.
Yi Zhang, et al. "$CO_2$ Capture by Imidazolate-Based Ionic Liquids: Effects of Functionalized Cation and Dication," 2013, Industrial & Engineering Chemistry Research, pp. 6069-6075.

\* cited by examiner

REDUCTION CATALYST, AND CHEMICAL REACTOR, REDUCTION METHOD AND REDUCTION PRODUCT-PRODUCING SYSTEM EMPLOYING THE CATALYST

CROSS-REFERENCE TO RELATED APPLICATIONS

This application is based upon and claims the benefit of priority from the prior Japanese Patent Application No. 2017-011523, filed on Jan. 25, 2017, the entire contents of which are incorporated herein by reference.

FIELD

Embodiments of the present disclosure relate to a reduction catalyst, and a chemical reactor, a reduction method and a reduction product-producing system employing the catalyst.

BACKGROUND

In view of energy and environmental problems, it is desired to reduce $CO_2$ by using light energy as efficiently as plants. Plants reduce $CO_2$ in a system referred to as "Z-scheme", which includes two-step excitation with light energy. Through photochemical reactions in this system, plants oxidize water ($H_2O$) to obtain electrons and thereby reduce carbon dioxide ($CO_2$) to synthesize cellulose and sugars.

The Z-scheme in plants is nowadays mimicked to develop artificial photosynthetic systems.

In the artificial photosynthetic systems, the electric potential necessary for reducing $CO_2$ is obtained from visible light by use of photo-catalysts. However, the photo-catalysts are generally poor in energy efficiency and accordingly the artificial photochemical reactions, which do not adopt any sacrificial reagent, proceed in very low efficiency and hence have room for improvement. Thus, it is desired to provide a highly efficient $CO_2$ reduction technology.

DETAILED DESCRIPTION

The reduction catalyst according to an embodiment comprises an electric conductor and an organic layer having organic modifying groups placed on the surface of said conductor; wherein said organic modifying groups have a structure represented by the following formula (A) or (B):

$$R^a{-}\underset{\underset{Y}{|}}{\overset{\overset{R^a}{|}}{N}}{-}(CH_2)_{na} \quad (A)$$

$$Z{-}\underset{\underset{Y}{|}}{(CH_2)_{nb}} \quad (B)$$

in which
each $R^a$ is independently H or an alkyl group of $C_1$ to $C_4$,
Z is an aromatic ring having two or more nitrogen atoms,
Y is a heteroatom-containing group capable of linking to said electric conductor layer,
na is an integer of 1 to 5 inclusive, and
nb is an integer of 0 to 6 inclusive.

The chemical reactor according to another embodiment comprises
an oxidation electrode,
a reduction electrode provided with the above reduction catalyst, and
a power supply unit connected to the oxidation and reduction electrodes.

The reduction method according to still another embodiment comprises the steps of:
bringing an electrolyte solution into contact with a reduction electrode provided with the above reduction catalyst, and then
introducing a low molecular weight-carbon compound into the electrolyte solution so as to reduce the introduced compound by the action of said electrode.

The reduction product-producing system according to yet another embodiment comprises:
a chemical reactor which comprises an oxidation electrolytic bath provided with an oxidation catalyst and a reduction electrolytic bath provided with the above reduction catalyst, so as produce a reduction product by a reduction reaction of carbon dioxide;
an electrolyte solution supply unit by which an electrolyte solution is supplied to the reduction electrolytic bath;
a carbon dioxide supply unit by which carbon dioxide is dissolved in the electrolyte solution so as to keep the reduction reaction in the reduction electrolytic bath and thereby to increase the concentration of the reduction product in the electrolyte solution; and
a separation unit by which the reduction product is separated from the electrolyte solution when the concentration thereof is increased.

Embodiments will now be explained with reference to the accompanying drawings.

First Embodiment

The reduction catalyst according to the first embodiment comprises an electric conductor and an organic layer having organic modifying groups placed on the surface of the conductor.

Figure 1:
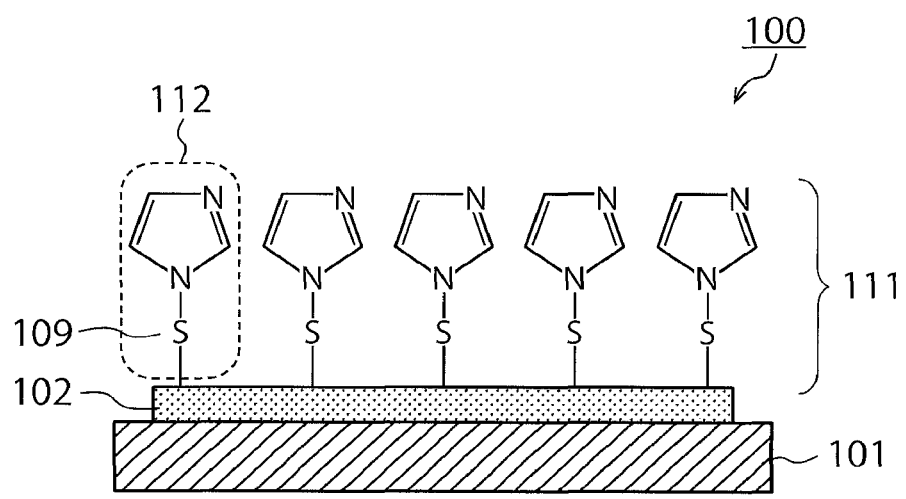
FIG. 1 schematically shows a structure of the reduction catalyst according to an embodiment.

The reduction catalyst of the first embodiment will be explained below with reference to FIG. 1, which schematically shows a structure of the reduction catalyst 100. As shown in FIG. 1, the reduction catalyst comprises a current collector 101 and organic modifying groups 112. The current collector 101 supports an electric conductor 102 provided thereon. The organic modifying groups 112 are combined with the electric conductor 102 to form a self-assembled monolayer (SAM) 111. Hereinafter, organic molecules giving the organic modifying groups are referred to as "organic modifying molecules".

The current collector 101 is made of material having electroconductivity. For example, the current collector 101 may be a stainless-steel substrate. The electric conductor 102, which is placed on the surface of the current collector 101, preferably contains at least one metal selected from the group consisting of: Au, Ag, Cu, Zn, Pt, Fe, Ti, Ni, Sn, In and Bi. The conductor 102 can contain ingredients other than metals, but preferably consists of metals only. Further, the electric conductor can be made of electroconductive metal oxides, such as, oxides selected from the group consisting of $Ag_2O$, CuO, $Ta_2O_5$, $TiO_2$, $ZrO_2$, $Al_2O_3$, $SiO_2$, ZnO, ITO, and FTO. The electric conductor 102 and the current collector 101 may be made of the same material. In that case, the metal of the conductor 102 may serve also as the collector 101.

The metal contained in the electric conductor 102 functions as a catalyst activating the reduction reaction. Accordingly, the metal in the conductor 102 is preferably in the form of such fine particles as to enhance the catalytic activity.

If the conductor 102 contains metal fine particles, the particles preferably have a mean size of 1 to 300 nm inclusive because the mean size of 300 nm or less can increase efficiency of the catalytic activity. It is, however, difficult to produce the fine particles having a mean size of less than 1 nm. The mean particle size is more preferably 150 nm or less because the catalytic activity efficiency is more increased. The metal particles either may be primary particles having a mean size of 50 nm or less, or may be secondary particles derived from aggregation of those primary particles.

The organic modifying group 112 comprises a heteroatom-containing group 109 at one terminal and a nitrogen-containing group at the other terminal. In FIG. 1, the heteroatom-containing group and the nitrogen-containing group are —S— and imidazole groups, respectively.

The organic modifying group is not limited to that in FIG. 1, and it is possible to adopt groups having a structure represented by the following formula (A) or (B):

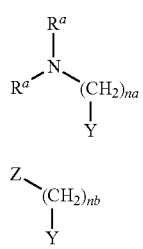

in which
each $R^a$ is independently H or an alkyl group of $C_1$ to $C_4$,
Z is an aromatic ring having two or more nitrogen atoms,
Y is a heteroatom-containing group capable of linking to the electric conductor,
na is an integer of 1 to 5 inclusive, and
nb is an integer of 0 to 6 inclusive.

Since the chain of na or nb is relatively short, the reduction reaction proceeds near the electric conductor 102. That is thought to be the reason why high reaction efficiency can be realized.

The nitrogen atom contained in the organic modifying group is presumed to capture the objective compound aimed to reduce, and accordingly the reaction efficiency also depends on the structures of substituent groups linking to the nitrogen atom For example, the number of carbon atoms contained in $R^a$ of the formula (A) is preferably large to a certain degree in view of increasing acidity of the organic modifying group, but on the other hand if having many carbon atoms, $R^a$ may be bulky to cause steric hindrance. Accordingly, $R^a$ is limited to H or an alkyl group of $C_1$ to $C_4$. Further, Z necessarily contains two or more nitrogen atoms for the purpose of ensuring adequate interaction with the objective atom, and the aromatic ring thereof is preferably a 5- or 6-membered one. Examples of the organic modifying group represented by the formula (B) include groups represented by the following formula (B-1) or (B-2):

in which nb and Y are the same as those described above.

The heteroatom-containing group 109 in FIG. 1 corresponds to Y in the formula (A) or (B). The group 109 has affinity with the electric conductor 102, and hence chemically combines therewith. The organic modifying group 112 is thus fixed on the conductor 102. The heteroatom-containing group 109 is preferably capable of forming a covalent bond with the conductor 102. Preferred examples of the group 109 include groups derived from thiol, disulfide and thiocyanate groups. Specifically, the heteroatom-containing group 109 is preferably selected from the group consisting of —S—, —S=S— and —N=C=S—. Particularly preferred is —S— derived from thiol group because it is excellent in bonding strength.

The organic modifying group 112 is preferably derived from an organic modifying molecule selected from the group consisting of: aminoethanethiol, aminopropanethiol, aminobutanethiol, methylaminoethanethiol, isopropylethylaminoethanethiol, dimethylaminoethanethiol, diethylaminoethanethiol, dibutylaminoethanethiol, mercaptoethylimidazole, mercaptopropylimidazole, mercaptobutylimidazole, captohexylimidazole, mercaptotriazole, mercaptoethyltriazole, mercaptopropyltriazole, mercaptobutyltriazole, and mercaptohexyltriazole.

The reduction catalyst 100 can be produced in the following manner.

First, the electric conductor 102 is formed on the surface of the current collector 101 by a known vacuum film-forming technique, such as, sputtering, vacuum deposition or ALD (atomic layer deposition).

The heteroatom-containing group 109 is then combined with the electric conductor 102, so that the organic modifying group 112 is fixed on the conductor 102. This procedure can be carried out in known manners. For example, the collector 101 provided with the conductor 102 is brought into contact with a solution in which the organic modifying molecules are dissolved. The organic modifying molecules may be vaporized in high vacuum and deposited to form a film thereof on the surface of the collector 101, or otherwise the modifying molecules may be sprayed onto the surface of the collector 101.

When the conductor 102 is wetted with the solution containing the modifying molecules dissolved therein, the modifying groups 112 are chemically adsorbed on the conductor 102 and then spontaneously form aggregates by the action of Van der Waals forces and hydrophobic interactions among the adsorbed molecules. The adsorbed molecules thus densely aggregate and consequently form an oriented monolayer.

Any solvent capable of dissolving the organic modifying molecules can be adopted to prepare the solution. For example, it can be selected from alcohols such as ethanol, aromatic organic solvents such as toluene and hexane, or aliphatic ones. Among them, ethanol is preferred because the modifying groups 112 are well dissolved therein and it is easy to handle.

The procedure for fixing the modifying groups 112 on the conductor 102 is, for example, carried out in the manner described below in detail.

First, the organic modifying molecules are dissolved to prepare a solution. In the prepared solution, the collector 101 provided with the conductor 102 is then immersed for several minutes to several hours. Thus, the modifying groups 112 are fixed on the surface of the conductor 102. The conditions, such as, concentration of the modifying molecules, immersion time and temperature, can be adequately changed according to the structure of the modifying groups 112 and the like. Those conditions influence formation of the monolayer of the modifying groups 112.

If the prepared solution has too low a concentration, it takes long time to form the monolayer. On the other hand, however, if the concentration is too high, the molecules may be further adsorbed on the formed monolayer to form a multilayer. Accordingly, the concentration of the modifying groups 112 is preferably 0.1 to 100 mM inclusive, more preferably 1 to 10 mM inclusive.

The immersion time is preferably long enough to form a dense and oriented monolayer, and is preferably 1 minute to 100 hours inclusive, more preferably 12 to 72 hours inclusive.

The temperature of the solution during the immersion step influences formation of the dense and oriented monolayer. In consideration of vapor pressure, boiling point and the like of the solvent, the temperature is preferably room temperature (25° C.) to 60° C. inclusive.

It can be verified by known electrochemical or surface analytical methods whether or not the modifying groups 112 are fixed on the surface of the conductor 102. The surface analysis can be carried out with a Fourier transform infrared (FT-IR) reflection spectrophotometer. This analysis can sensitively measure IR spectra of the thin layer and the molecular species adsorbed on the surface of the collector 101. Accordingly, the analysis can reveal the structure of the organic molecule and particularly can provide knowledge of the functional groups therein. The surface analysis also can be carried out by X-ray photoelectron spectroscopy (XPS). This analysis can determine the elemental species of the molecules.

As an example of the reaction with the reduction catalyst 100, reduction of $CO_2$ is then explained below. In an elementary reaction of $CO_2$ reduction, $CO_2$ undergoes one-electron reduction to be a $CO_2$ radical anion. This reaction necessarily proceeds in a large overvoltage condition. However, the overvoltage condition causes energy loss, and hence lowers the energy conversion efficiency. Further, the reduction of $CO_2$ is accompanied with that of $H_2O$ and $H^+$ as side reactions, which result in generating $H_2$. Accordingly, the side reactions decrease the faradaic efficiency of the $CO_2$ reduction reaction. Despite those, the reduction catalyst 100 according to the embodiment can realize high reduction efficiency.

The reduction catalyst 100 contains a nitrogen-containing group, which has such high affinity with $CO_2$ as to contribute toward generation and stabilization of a $CO_2$ radical anion. Further, the nitrogen-containing group reacts with a $CO_2$ molecule to form a carbonate. The nitrogen-containing groups thus attract $CO_2$ molecules necessary for the reduction reaction, and then form salts with resultant carboxylic acids (such as, formic acid, acetic acid, oxalic acid) produced by the $CO_2$ reduction. Because of that, the catalyst has an effect of promoting a multielectron reduction reaction in which the reduction proceeds continuously. In this way, the reduction catalyst 100 makes it possible to improve the reduction efficiency and hence can cause the $CO_2$ reduction reaction with low energy. As a result, the reduction catalyst can improve the energy conversion efficiency. Further, the monolayer densely combined with the conductor 102 has an effect of preventing $H_2O$ and $H^+$ from approaching the conductor, and hence provides reaction selectivity of reduction on the conductor 102. This means that the monolayer can inhibit generation of $H_2$ caused by the side reactions and accordingly can improve the faradaic efficiency.

For the reasons described above, the present embodiment can provide a reduction catalyst of high reaction efficiency.

The reduction catalyst according to the embodiment can be applied to reduction of a material selected from the group consisting of carbon dioxide, oxalic acid and glyoxal. Reduction products depend on interactions among the organic modifying molecule, the conductor 102 and the material aimed to reduce. For example, when $CO_2$ is reduced, formable reduction products are carbon monoxide (CO), formic acid (HCOOH), formic aldehyde (HCHO), methanol ($CH_3OH$), acetic acid ($CH_3COOH$), acetaldehyde ($CH_3CHO$), ethanol ($CH_3CH_2OH$), oxalic acid (($COOH)_2$), glyoxal and ethylene glycol ($HOCH_2CH_2OH$).

Among the above, the reduction catalyst 100 of the present embodiment can produce ethylene glycol in high selectivity. It becomes, therefore, possible to provide a reduction catalyst-application process in which the reduction catalyst 100 is used to reduce a material selected from the group consisting of carbon dioxide, oxalic acid and glyoxal and thereby to produce products including ethylene glycol.

Second Embodiment

Figure 2:
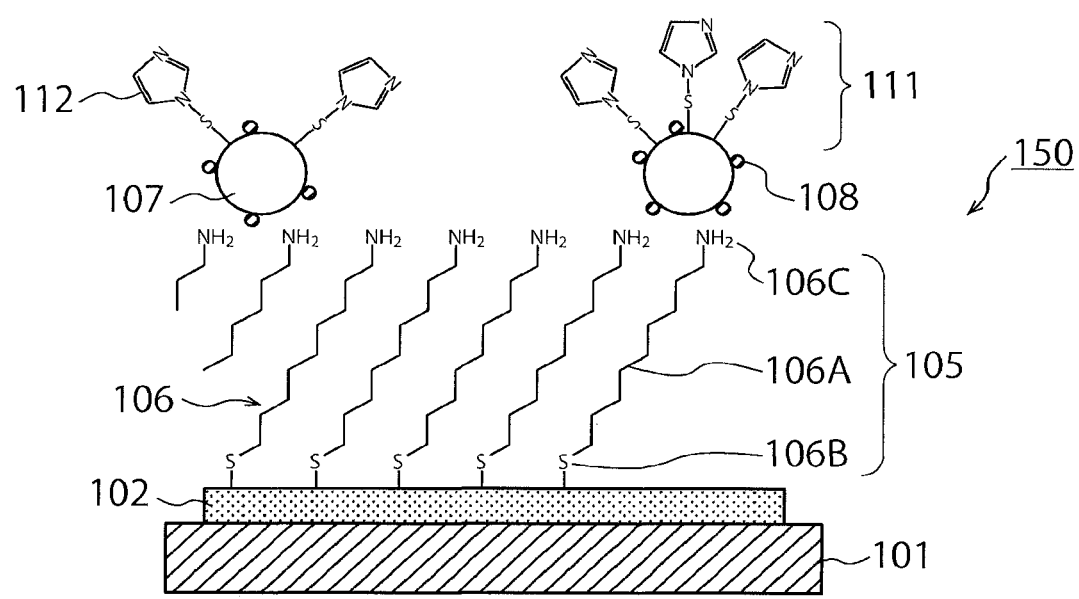
FIG. 2 schematically shows a structure of the reduction catalyst according to another embodiment.

FIG. 2 schematically shows the structure of a reduction catalyst 150 according to the present embodiment. As shown in FIG. 2, the reduction catalyst 150 comprises a current collector 101 provided with an electric conductor 102, a spacer organic molecule layer 105 formed on the surface of the conductor 102, metal fine particles 107 linked to the surface of the spacer organic molecule layer 105, and organic modifying groups 112 combined with the metal fine particles 107. In this embodiment, the metal fine particle 107 functions as the electric conductor. Thus, this embodiment comprises two kind of the electric conductor.

The collector 101 and the conductor 102 may be the same as those in the first embodiment.

The spacer organic molecule layer 105 is a self-assembled monolayer formed through a process in which spacer groups 106 derived from spacer organic molecules are adsorbed and then self-assembled on the surface of the conductor 102.

The spacer group 106 comprises, for example, an alkylene skeleton 106A, a first reactive functional group 106B positioned at one terminal, and a second reactive functional group 106C positioned at the other terminal.

In accordance with increase of the chain length in the spacer group 106, the density and orientation are enhanced in the formed monolayer. Because of that, according as the chain length is extended, the metal fine particles 107 becomes easy to fix and the monolayer becomes highly durable. However, if the chain is too long, the spacer organic molecule layer 105 has such large tunnel current resistance as to increase electrode resistance of the reduction catalyst 150. Accordingly, the spacer group 106 contains preferably 2 to 12, more preferably 2 to 6 carbon atoms in total.

The first reactive functional group 106B has affinity with the electric conductor 102, and hence chemically combines therewith. The organic spacer group 106 is thus fixed on the conductor 102. The first reactive functional group 106B is preferably capable of forming a covalent bond with the conductor 102. Preferred examples of the group 106 include groups derived from thiol, disulfide and thiocyanate groups. Specifically, the group 106B is preferably selected from the group consisting of —S—, —S=S— and —N=C=S—. Particularly preferred is —S— derived from thiol group because it is excellent in bonding strength.

The second reactive functional group 106C has affinity with the metal fine particle 107, and hence chemically combines therewith. The particle 107 is thus fixed on the spacer organic molecule layer 105. The second reactive functional group 106C is preferably capable of forming an electrostatic bond with the particle 107 charged electrically, and preferred examples thereof include amino group and carboxyl group. Instead, the second reactive functional group 106C is preferably capable of forming a covalent bond with the particle 107, and preferred examples thereof include groups derived from thiol, disulfide and thiocyanate groups.

Examples of spacer organic molecules capable of forming the spacer layer 105 include the same molecules as those giving the organic modifying group 112 described above in the first embodiment. In addition, the examples further include such molecules as: 10-carboxy-1-decanethiol, 7-carboxy-1-heptanethiol, 5-carboxy-1-pentanethiol, 3-carboxy-1-pentanethiol, mercaptoacetic acid, 10-carboxydecyl disulfide, 7-carboxyheptyl-disulfide, 5-carboxypentyl-disulfide, 4,4'-dithiodibutanoic acid, 11-amino-1-undecanethiol, 8-amino-1-octanethiol, 1,2-ethanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,11-undecanedithiol, 1,12-dodecanedithiol, 1,13-tridecanedithiol, 1,14-tetradecanedithiol, 1,15-pentadecanedithiol, and 1,16-hexadecanedithiol.

The metal fine particles 107 function as a catalyst activating the reduction reaction. They are made of at least one element selected from the group consisting of Au, Ag, Cu, Pt, Zn, Fe, Ti, Sn, Bi and Ni. The fine particles 107 are preferably those of Au or Ag because they have high catalytic activity.

The metal particles 107 preferably have a mean size of 1 to 300 nm inclusive because the mean size of 300 nm or less can increase the efficiency of the catalytic activity. It is, however, difficult to produce the particles 107 having a mean size of less than 1 nm. The mean particle size is more preferably 150 nm or less because the efficiency of catalytic activity is more increased. The metal particles 107 either may be primary particles having a mean size of 50 nm or less, or may be secondary particles derived from aggregation of those primary particles.

The mean size of the particles 107 can be determined according to particle size distribution measurement by dynamic light scattering. Specifically, the fine particles 107 are dispersed in a solution and then laser beams are applied to the dispersion to detect fluctuating scattered light. The fluctuation of scattered light suggests the diffusion coefficient, and hence the particle size can be calculated from the result according to the Stokes-Einstein equation. How frequently the particles of each size are thus detected is integrated to obtain a frequency distribution, in which the most frequent size or the size giving the maximum frequency is the mode size of the distribution. The mode size is regarded as the mean particle size.

The metal fine particle 107 may have an electrically charged organic molecule 108 on a part of the surface. That particle 107 consequently has an electrically charged surface. The charge on the particle 107 can be so controlled that the particle 107 can be fixed on the spacer organic molecule layer 105 through electrostatic attraction (electrostatic attraction bond) to the charge of the second reactive functional group 106C. The organic molecule 108 may be charged either positively or negatively.

If the organic molecule has negative charge, the surface of the particle 107 is negatively charged. In that case, the spacer organic molecule 106 is so selected as to have an amino group as the second reactive functional group 106C for fixing the particle 107.

On the other hand, if the organic molecule is charged positively, the spacer molecule 106 is so selected as to have a carboxyl group as the second reactive functional group 106C for fixing the particle 107.

If the fine particles 107 are thus electrically charged, they electrostatically repel each other and hence can be prevented from gathering to form aggregates of nanosize particles.

The organic modifying group 112 is linked to the particle 107, and has an effect of promoting the reduction reaction. The modifying group 112 can be the same as that in the first embodiment. The heteroatom-containing group 109 in the modifying group 112 has affinity with the particle 107, and hence chemically combines therewith. The modifying group 112 is thus fixed on the metal fine particle 107. In this embodiment, the metal fine particles are loaded on a spacer layer that is made of organic material and formed on another electric conductor on a current collector.

The reduction catalyst 150 can be produced in the following manner.

First, the electric conductor 102 is formed on the surface of the current collector 101 by a known vacuum film-forming technique, such as, sputtering, vacuum deposition or ALD (atomic layer deposition). The spacer groups 106 are then fixed on the conductor 102 to form the spacer organic molecule layer 105. This procedure can be carried out in the same manner as that for fixing the modifying groups 112 on the conductor 102 in a production process of the reduction catalyst 100 according to the first embodiment.

It can be verified whether or not the spacer layer 105 is formed on the conductor 102 also in the same manner as that for verifying whether or not the modifying groups 112 are fixed on the conductor 102 in a production process of the reduction catalyst 100 according to the first embodiment.

Thereafter, the metal fine particles 107 are prepared. If necessary, the organic molecule 108 is fixed on the particle. This procedure can be carried out in the following first or second manner.

(First Manner)

In a first process for preparing the metal fine particles, a reducing agent such as citric acid is employed to conduct reduction when metal fine particles are obtained from a liquid phase. The agent such as citric acid is attached on the surface of the particle thus obtained, and thereby the surface is negatively charged. Successively, the negatively charged surface is electrostatically combined with a molecule having an amino group.

(Second Manner)

In order to positively charge the metal fine particle, an uncharged surface of the particle is combined with an amine molecule having a covalent reactive group such as thiol. This process makes it possible to fix a charged organic molecule whether the particle surface is charged positively, negatively or not.

In the next step, the metal fine particles 107 loaded with the charged organic molecules 108 are fixed on the surface of the spacer organic molecule layer 105. Specifically, the particles 107 are dispersed in a disperse medium to prepare a dispersion, in which the collector 101 provided with the spacer layer 105 formed thereon is then immersed. Thus, the second reactive group 106C in the spacer layer 105 is electrostatically combined with the organic molecules 108 on the particle 107 and thereby the particle 107 is fixed on the spacer layer 105.

The disperse medium in which the particles 107 are dispersed is not particularly restricted as long as it can stably disperse the particles. Examples thereof include water, ethanol and toluene, and preferred are water and ethanol because they are easy to handle.

The dispersion conditions, such as, concentration, immersion time and temperature, are adequately determined because they depend on the synthesis method and stability of the metal fine particles 107.

If the dispersion has too low a concentration, it takes long time to fix the particles 107. However, if the concentration is too high, there is a fear that the particles 107 may aggregate and fail to fix on the spacer layer 105. Accordingly, the concentration of the particles in the dispersion is preferably 0.01 to 10 mM inclusive, more preferably 0.1 to 1 mM inclusive.

The immersion time is preferably 1 to 50 hours inclusive, more preferably 5 to 24 hours inclusive so that the particles 107 can be fixed in a sufficient amount.

The dispersion temperature during the immersion step is preferably room temperature (25° C.) to 35° C. inclusive. At a high temperature, there is a fear that the dispersion stability of the particles 107 is so lowered that they may aggregate.

It can be verified by known electrochemical or surface analytical methods whether or not the particles 107 are fixed on the surface of the spacer layer 105.

In the surface analysis, it can be directly observed by means of a scanning electron microscope (SEM), a transmission electron microscope (TEM), an atomic force microscope (AFM), or a scanning transmission microscope (STEM). Further, the metal composition can be analyzed according to, for example, energy dispersive X-ray spectrometry (EDX), electron probe microanalysis (EPMA) or X-ray photoelectron spectroscopy (XPS).

Subsequently, the organic modifying group 112 is combined with the particle 107 fixed on the spacer layer 105. This procedure can be carried out in the same manner as that for fixing the modifying groups 112 on the conductor 102 in a production process of the reduction catalyst 100 according to the first embodiment.

The procedure for fixing the modifying group 112 on the particle 107 is, for example, carried out in the manner described below in detail.

First, the organic modifying molecules are dissolved to prepare a solution containing the modifying groups 112 dissolved therein. In the prepared solution, the collector 101 provided with the metal fine particles 102 is then immersed for several minutes to several hours. Thus, the modifying groups 112 are fixed on the surface of the particles 107. The conditions, such as, concentration of the modifying groups, immersion time and temperature, can be adequately changed according to the structure of the modifying groups 112 and the like.

If the prepared solution has too low a concentration, it takes long time to fix the modifying groups 112 in a sufficient amount. On the other hand, however, if the concentration is too high, the modifying groups 112 may be excessively adsorbed to accumulate. Accordingly, the concentration of the modifying groups 112 is preferably 0.1 to 100 mM inclusive, more preferably 1 to 10 mM inclusive.

The immersion time is preferably long enough to form a dense and oriented monolayer, and is preferably 1 minute to 100 hours inclusive, more preferably 12 to 72 hours inclusive.

The prepared solution temperature during the immersion step influences formation of the dense and oriented monolayer. In consideration of vapor pressure, boiling point and the like of the solvent, the temperature is preferably room temperature (25° C.) to 60° C. inclusive.

In this way, the reduction catalyst 150 can be produced.

As an example of the reaction with the reduction catalyst 150, reduction of $CO_2$ is then explained below. As described in the first embodiment, the elementary reaction of normal $CO_2$ reduction has a problem of low faradaic efficiency. However, the reduction catalyst 150 according to the present embodiment can realize high reduction efficiency.

In the reduction catalyst 150, the reduction reaction proceeds at the metal fine particle 107, where the modifying groups 112 reacts with $CO_2$ to form a reaction intermediate. The catalyst thus contributes toward generation and stabilization of a $CO_2$ radical anion, and hence can cause the $CO_2$ reduction reaction with low energy. As a result, the reduction catalyst can improve the energy conversion efficiency. Further, the monolayer has an effect of preventing $H_2O$ and $H^+$ from approaching the particles 107, and hence provides reaction selectivity of reduction on the particles 107. This means that the monolayer can inhibit generation of $H_2$ caused by the side reactions, and accordingly can improve the faradaic efficiency.

Further, the amino group in the modifying group 112 reacts with a $CO_2$ molecule to form a carbonate. The amino groups thus attract $CO_2$ molecules necessary for the reduction reaction, and provide them to the metal fine particles 107. In addition, the amino groups form salts with resultant carboxylic acids (such as, formic acid, acetic acid, oxalic acid) produced by the $CO_2$ reduction. Because of that, the catalyst has an effect of promoting a multielectron reduction reaction in which the reduction proceeds continuously. As a result, the reduction catalyst can improve the energy conversion efficiency.

Furthermore, since comprising the metal fine particles 107, the reduction catalyst 150 can have a larger reaction area (surface area) than a tabular metal layer. Accordingly, the reduction efficiency can be further improved.

For the reasons described above, the present embodiment can provide a reduction catalyst of high reaction efficiency.

The reduction catalyst 150 according to the embodiment can be applied to reduction of a material selected from the group consisting of carbon dioxide, oxalic acid and glyoxal. Reduction products depend on interactions among the organic modifying molecules, the conductor 102 and the material aimed to reduce. For example, when $CO_2$ is reduced, formable reduction products are carbon monoxide (CO), formic acid (HCOOH), formic aldehyde (HCHO), methanol ($CH_3OH$), acetic acid ($CH_3COOH$), acetaldehyde ($CH_3CHO$), ethanol ($CH_3CH_2OH$), oxalic acid (($COOH)_2$), glyoxal and ethylene glycol ($HOCH_2CH_2OH$).

Among the above, the reduction catalyst 150 of the present embodiment can produce ethylene glycol in high selectivity. It becomes, therefore, possible to provide a reduction catalyst-application process in which the reduction catalyst 150 is used to reduce a material selected from the group consisting of carbon dioxide, oxalic acid and glyoxal and thereby to produce products including ethylene glycol.

Third Embodiment

As the third embodiment, the following describes a chemical reactor employing the reduction catalyst according to the first embodiment. Although the explanation is omitted, the reduction catalyst according to the second embodiment also can be used in place of that of the first embodiment.

The chemical reactor comprises a photochemical reaction cell, which is explained below with referring to FIGS. 3 to 5. The photochemical reaction cell comprises an oxidation catalyst layer, a reduction catalyst layer containing the reduction catalyst, and a power supply unit connected to the oxidation and reduction catalyst layers. The power supply unit preferably comprises a semiconductor layer in which charge separation is caused by light energy, and is preferably a solar cell, for example. The semiconductor layer is preferably placed between the oxidation and reduction catalyst layers.

Figure 3:
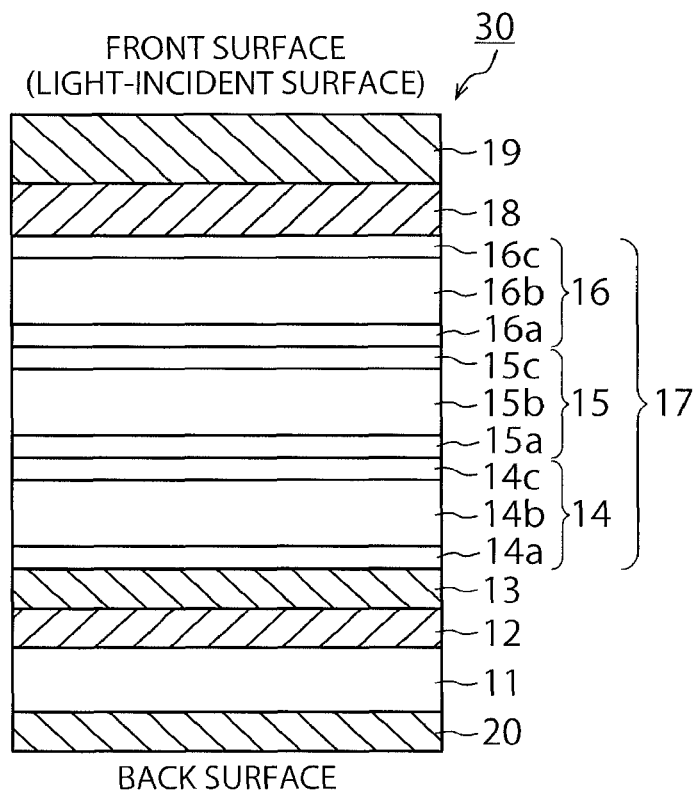
FIG. 3 is a schematic sectional view showing a structure of the photochemical reaction cell according to an embodiment.

FIG. 3 is a sectional view schematically showing the structure of a photochemical reaction cell 30. As shown in FIG. 3, the reaction cell 30 is a laminate in which a reduction catalyst layer 20, a substrate 11, a reflection layer 12, a reduction electrode layer 13, a multi-junction solar cell 17, an oxidation electrode layer 18 and an oxidation catalyst layer 19 are stacked in this order. In the reaction cell 30, the reduction catalyst layer 20 is placed on the back side and the oxidation catalyst layer 19 is placed on the top side exposed to light.

The substrate 11 is provided for the purposes of supporting the photochemical reaction cell and of enhancing mechanical strength thereof. It is, for example, a plate made of a metal selected from the group consisting of Au, Ag, Cu, Pt, Zn, Fe, Ti, Sn, In, Bi and Ni or of an alloy containing at least one of them. The alloy plate is, for example, a plate of SUS. The substrate 11 also can be made of electroconductive resins, semiconductors such as Si and Ge, or ion-exchange membranes.

The reflection layer 12 is formed on the surface of the substrate 11, and is made of a material capable of reflecting light. For example, it may be a distributed Bragg reflector comprising a metal layer or a semiconductor multilayer. The reflection layer 12 is placed between the substrate 11 and the multi-junction solar cell 17, and hence can reflect light not absorbed by the solar cell 17 so that the light can reenter the solar cell 17. The reflection layer 12 thus can enhance light absorption of the solar cell 17.

The reduction electrode layer 13 is placed on the reflection layer 12, and sandwiched between the reflection layer 12 and an n-type semiconductor layer (n-type amorphous silicon layer 14a, described later) in the solar cell 17. Accordingly, the reduction electrode layer 13 is preferably made of a material capable of having ohmic contact with the n-type semiconductor layer. For example, the electrode layer 13 is made of a metal such as Au, Ag, Al or Cu or made of an alloy containing at least one of them. The reduction electrode layer 13 may be made of a transparent electroconductive oxide, such as, ITO (indium tin oxide), zinc oxide (ZnO), FTO (fluorine-doped tin oxide), AZO (aluminum-doped zinc oxide) or ATO (antimony-doped tin oxide). Further, the electrode layer 13 also may have a structure, for example, in which a metal and a transparent electroconductive oxide are laminated, in which a metal and another electroconductive material are combined, or in which a transparent electroconductive oxide and another electroconductive material are combined.

The multi-junction solar cell 17 is placed on the reduction electrode layer 13, and is a laminate in which a first solar cell 14, a second solar cell 15 and a third solar cell 16 are stacked in this order from the electrode layer 13 side. All of those cells employ pin-junction semiconductors. The first, second and third solar cells 14, 15 and 16 are different from each other in the light absorption wavelength region. Since comprising those cells laminated tabularly, the multi-junction solar cell 17 can absorb sunlight in a wide wavelength range. Thus, it becomes possible to utilize solar energy efficiently. Further, since the solar cells are connected in series, it is possible to obtain a high open circuit voltage.

The first solar cell 14 comprises an n-type amorphous silicon (a-Si) layer 14a, an intrinsic amorphous silicon germanium (a-SiGe) layer 14b, and a p-type fine-crystalline silicon (μc-Si) layer 14c stacked in the order from the electrode layer 13 side. The a-SiGe layer 14b absorbs light in a short wavelength region around 400 nm. Accordingly, in the first solar cell 14, charge separation is caused by light energy in the short wavelength region.

The second solar cell 15 comprises an n-type a-Si layer 15a, an intrinsic a-SiGe layer 15b, and a p-type pc-Si layer 15c stacked in the order from the electrode layer 13 side. The a-SiGe layer 15b absorbs light in an intermediate wavelength region around 600 nm. Accordingly, in the second solar cell 15, charge separation is caused by light energy in the intermediate wavelength region.

The third solar cell 16 comprises an n-type a-Si layer 16a, an intrinsic a-SiGe layer 16b, and a p-type μc-Si layer 16c stacked in the order from the electrode layer 13 side. The a-SiGe layer 16b absorbs light in a long wavelength region around 700 nm. Accordingly, in the third solar cell 16, charge separation is caused by light energy in the long wavelength region.

In the multi-junction solar cell 17, charge separation is thus caused by light in each wavelength region and consequently positive holes and electrons are separated and moved to the positive electrode side (top side) and to the negative electrode side (back side), respectively. In this way, the multi-junction solar cell 17 generates electromotive force.

The above explains the multi-junction solar cell 17 comprising a laminate of three solar cells, but the present embodiment is not limited to the above. For example, it is possible to adopt a multi-junction solar cell comprising a laminate of two, four or more solar cells. Further, in place of the multi-junction solar cell 17, the embodiment may employ a single solar cell. Furthermore, although the solar cells described above comprise pin-junction semiconductors, the embodiment may employ a solar cell of pn-junction semiconductors. The solar cell may comprise a semiconductor layer of, for example, GaAs, GaInP, AlGaInP, CdTe or CuInGaSe, and the semiconductors may be in any form, such as, single crystal, multicrystal or amorphous.

The oxidation electrode layer 18 is placed on the multi-junction solar cell 17, and sandwiched between the p-type semiconductor layer in the solar cell 17 and the oxidation catalyst layer 19. Accordingly, the oxidation electrode layer 18 is preferably made of a transparent material capable of having ohmic contact with the p-type semiconductor layer. For example, the electrode layer 18 is made of a transparent electroconductive oxide, such as, ITO (indium tin oxide), zinc oxide (ZnO), FTO (fluorine-doped tin oxide), AZO (aluminum-doped zinc oxide) or ATO (antimony-doped tin oxide). The electrode layer 18 may have a structure, for example, in which a metal and a transparent electroconductive oxide are laminated, in which a metal and another electroconductive material are combined, or in which a transparent electroconductive oxide and another electroconductive material are combined.

The oxidation catalyst layer 19 is placed on the positive electrode side of the multi-junction solar cell 17, and is formed on the oxidation electrode layer 18. When the electrolyte solution has a hydrogen ion concentration of less than 7 (pH<7), the oxidation catalyst layer 19 oxidizes $H_2O$ to generate $O_2$ and H. On the other hand, however, it oxidizes $OH^-$ to generate $O_2$ and $H_2O$ when the electrolyte solution has a hydrogen ion concentration of more than 7 (pH>7). Accordingly, the catalyst layer 19 is made of a material lowering activation energy of the oxidation reaction, that is, a material lowering overvoltage of the reaction in which $H_2O$ or $OH^-$ is oxidized to extract electrons.

Examples of the material include: binary metal oxides, such as, manganese oxide (Mn—O), iridium oxide (Ir—O), nickel oxide (Ni—O), cobalt oxide (Co—O), iron oxide (Fe—O), Tin oxide (Sn—O), indium oxide (In—O) and ruthenium oxide (Ru—O); ternary metal oxides, such as, Ni—Co—O, La—Co—O, Ni—La—O and Sr—Fe—O; quaternary metal oxides, such as, Pb—Ru—Ir—O and La—Sr—Co—O; and metal complexes, such as, Ru complexes and Fe complexes.

The oxidation catalyst layer 19 is in the form not restricted to a thin film, and may be in the form of, for example, a grid, particles or a wire.

In the photochemical reaction cell 30, incident light comes through the oxidation catalyst layer 19 and the oxidation electrode layer 18 and then reaches to the multi-junction solar cell 17. Accordingly, the catalyst layer 19 and the electrode layer 18 are transparent to the incident light. Specifically, they are so transparent that the light can pass in an amount of 10% or more, preferably 30% or more.

The reduction catalyst layer 20 is placed on the negative electrode side of the multi-junction solar cell 17, and is formed on the back surface of the substrate 11. The reduction catalyst layer 20 reduces a material aimed to reduce, such as $CO_2$, and thereby generates carbon compounds (e.g., carbon monoxide, formic acid, formic aldehyde, methane, methanol, acetic acid, acetaldehyde, ethanol, ethylene glycol). Accordingly, the catalyst layer 20 is made of a material lowering activation energy for reducing the material aimed to reduce.

As the reduction catalyst layer 20 described above, the reduction catalyst 100 of the first embodiment is employed. This means that the reduction catalyst layer 20 comprises the current collector 101 and the organic modifying groups 112 having nitrogen atoms. The collector 101 may serve as the substrate 11.

There may be an electroconductive protective layer on the surface of the multi-junction solar cell 17 or between the electrode layer and the catalyst layer on the light-incident side (i.e., between the oxidation electrode layer 18 and the oxidation catalyst layer 19 in the photochemical reaction cell 30). The protective layer protects the solar cell 17 from corrosion in the oxidation-reduction reaction, and consequently can extend the working lifetime of the solar cell 17. If necessary, the protective layer may be transparent. Examples of the protective layer include: dielectric thin films of $TiO_2$, $ZrO_2$, $Al_2O_3$, $SiO_2$ and $HfO_2$. The protective layer has a thickness of preferably 10 nm or less, more preferably 5 nm or less so as to ensure electric conductivity based on tunneling effect.

Figure 4:
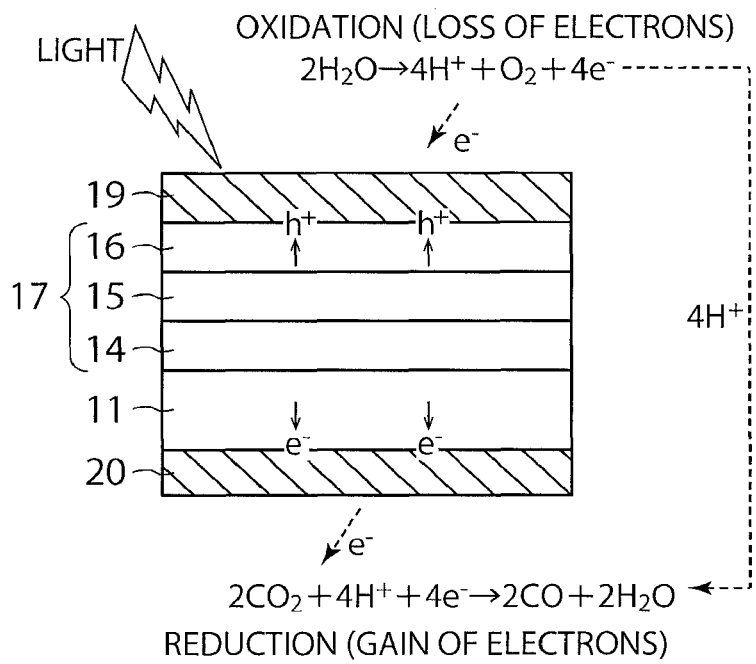
FIG. 4 is a schematic sectional view illustrating an example of the working principle of the photochemical reaction cell according to the embodiment.
Figure 5:
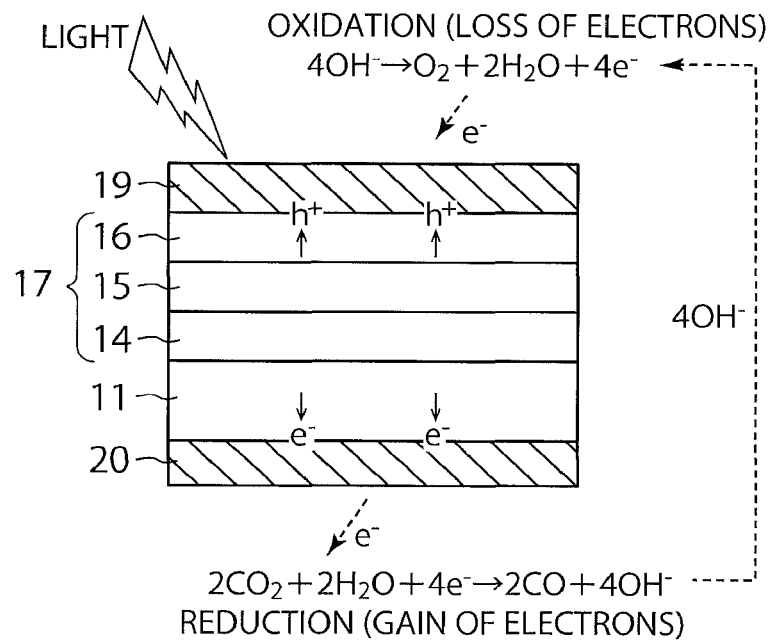
FIG. 5 is a schematic sectional view illustrating another example of the working principle of the photochemical reaction cell according to the embodiment.

FIGS. 4 and 5 are schematic sectional views illustrating the working principle of the photochemical reaction cell 30. In those figures, the reflection layer 12, the reduction electrode layer 13 and the oxidation electrode layer 18 are omitted.

As shown in FIGS. 4 and 5, when coming from the top side, incident light (L) passes through the oxidation catalyst layer 19 and reaches to the multi-junction solar cell 17. The solar cell 17 absorbs the light to generate photoexcited electrons and their counterpart positive holes, which are then separated. Specifically, in each of the solar cells (i.e., first, second and third solar cells 14, 15 and 16), the photoexcited electrons move to the n-type semiconductor layer side (reduction catalyst layer 20 side) while the holes counterpart to the photoexcited electrons move to the p-type semiconductor layer side (oxidation catalyst layer 19 side). Because of charge separation thus caused, the multi-junction solar cell 17 generates electromotive force.

The photoexcited electrons generated in the solar cell 17 are used in the reduction reaction on the reduction catalyst layer 20 serving as the negative electrode. On the other hand, the positive holes are used in the oxidation reaction on the oxidation catalyst layer 19 serving as the positive electrode.

FIG. 4 shows an example when the electrolyte solution is an acidic solution, which has a hydrogen ion concentration of less than 7. The following reaction (1) proceeds near the oxidation catalyst layer 19, so that $H_2O$ is oxidized to generate $H^+$, $O_2$ and electrons. The generated $H^+$ moves to the reduction catalyst layer 20 side by way of the ion migration path described later. Meanwhile, the following reaction (2) proceeds near the reduction catalyst layer 20, so that $CO_2$ is reduced by the transferred $H^+$ and electrons to generate carbon monoxide (CO) and $H_2O$.

$$4H_2O \rightarrow 4H^+ + O_2 + 4e^- \quad (1)$$

$$2CO_2 + 4H^+ + 4e^- \rightarrow 2CO + 2H_2O \quad (2)$$

FIG. 5 shows an example when the electrolyte solution is a basic solution, which has a hydrogen ion concentration of more than 7. The following reaction (3) proceeds near the oxidation catalyst layer 19, so that OH⁻ is oxidized to generate O₂, H₂O and electrons. Meanwhile, the following reaction (4) proceeds near the reduction catalyst layer 20, so that both CO₂ and H₂O receive the electrons and are thereby reduced to generate carbon monoxide (CO) and OH⁻. The OH⁻ generated on the reduction catalyst layer 20 side moves to the oxidation catalyst layer 19 side by way of the ion migration path described later.

$$4OH^- \rightarrow O_2 + 2H_2O + 4e^- \quad (3)$$

$$2CO_2 + 2H_2O + 4e^- \rightarrow 2CO + 4OH^- \quad (4)$$

The multi-junction solar cell 17 necessarily has an open circuit voltage not less than the difference between the standard potential of oxidation on the oxidation catalyst layer 19 and that of reduction on the reduction catalyst layer 20. For example, when the reaction solution has a hydrogen ion concentration of 0 (pH=0), the standard potential of oxidation in the formula (1) is +1.23 V while that of reduction in the formula (2) is −0.1 V. Accordingly, the multi-junction solar cell 17 must have an open circuit voltage of 1.33 V or more.

The open circuit voltage is more preferably required to be not less than the potential difference including the overvoltage. Specifically, if there is an overvoltage of 0.2 V in each of the oxidation and reduction in the formulas (1) and (2), respectively, the open circuit voltage is preferably 1.73 V or more.

Although the above formulas (2) and (4) indicate reduction of CO₂ into CO, the reduction reaction is not limited to that. For example, it is possible to reduce CO₂ into HCOOH, HCHO, CH₄, CH₃OH, HOCH₂CH₂OH and the like. Any of those consumes H⁺ or generates OH⁻, and hence the total reaction efficiency is lowered if H⁺ generated on the oxidation catalyst layer 19 cannot move to the counter reduction catalyst layer 20 or if OH⁻ generated on the reduction catalyst layer 20 cannot move to the counter oxidation catalyst layer 19. In view of that, the chemical reactor according to the present embodiment is provided with an ion migration path through which H⁺ or OH⁻ can be transferred. The reactor can be thus improved in the migration of H⁺ or OH⁻. In this way, the present embodiment can realize high photoreaction efficiency.

The chemical reactor comprising the above photochemical reaction cell is then explained below with referring to FIGS. 6 to 9. As an example, the oxidation-reduction reaction in the following explanation is thought to proceed under the condition where the electrolyte solution has a hydrogen ion concentration of less than 7, that is, where the solution is acidic (i.e., the reaction corresponds to the formulas (1) and (2)). If the electrolyte solution has a hydrogen ion concentration of more than 7, that is, if the solution is basic, the oxidation-reduction reaction proceeds according to the formulas (3) and (4).

Figure 6:
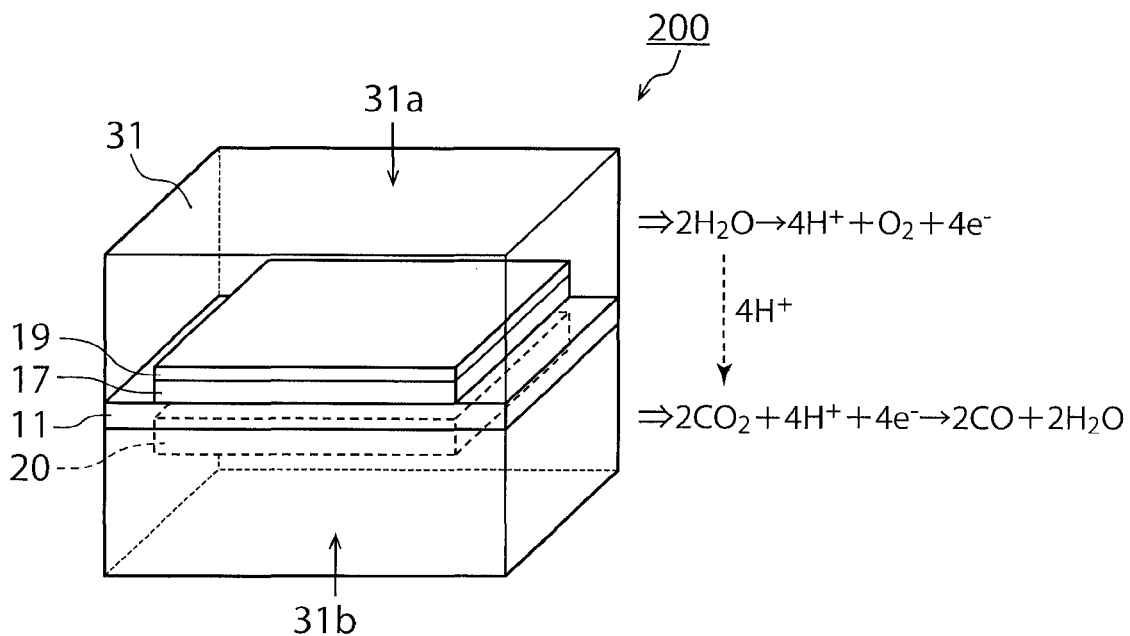
FIG. 6 is a perspective view schematically illustrating a structure of the photochemical reactor according to an embodiment.
Figure 7:
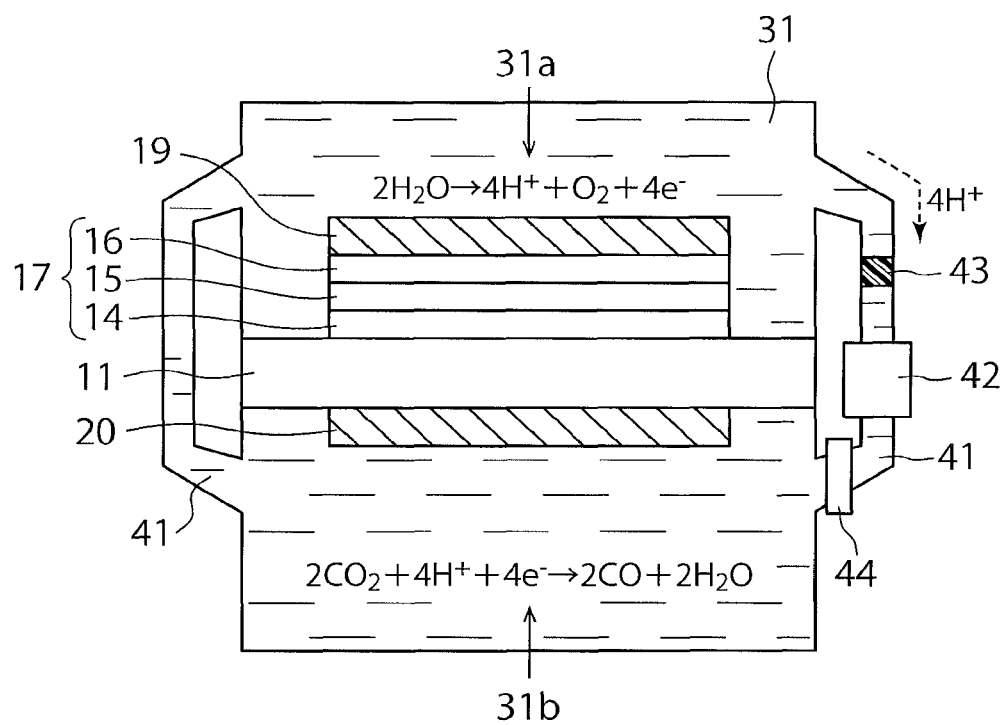
FIG. 7 is a schematic sectional view showing a structure of the photochemical reactor according to the embodiment.

FIG. 6 is a perspective view schematically illustrating a structure of the photochemical reactor 200 according to the present embodiment, and FIG. 7 is a schematic sectional view showing a structure of the reactor 200. The reactor 200 comprises: a photochemical reaction cell 30, an electrolytic bath 31 containing the photochemical reaction cell, and an electrolytic bath flow channel 41 serving as the ion migration path linked to the bath 31. In FIG. 6, the ion migration path is omitted. As described above, the photochemical reaction cell 30 comprises a laminate of the oxidation catalyst layer 19, the reduction catalyst layer 20, the multi-junction solar cell 17 sandwiched between them, and the substrate 11.

The electrolytic bath 31 comprises an oxidation electrolytic bath 31a provided with the oxidation catalyst layer 19 and a reduction electrolytic bath 31b provided with the reduction catalyst layer 20. In the oxidation electrolytic bath 31a, H₂O is oxidized by the catalyst layer 19 to generate O₂ and H⁺. In the reduction electrolytic bath 31b, CO₂ is reduced by the catalyst layer 20 to generate CO and H₂O. Those electrolytic bathes are separated with the substrate 11 of the photochemical reaction cell 30. In the present example, the substrate 11 is larger than the solar cell 17 and the catalyst layers 19 and 20 and hence the side ends of the substrate protrudes from both sides. However, this example by no means restricts the substrate 11, and all of the substrate 11, the solar cell 17 and the catalyst layers 19 and 20 may be the same size tabular plates.

It is possible to supply different electrolyte solutions to the oxidation and reduction electrolytic bathes 31a and 31b, respectively. The flow channel 41, which enables ions to migrate, connects the bathes 31a and 31b.

The flow channel 41 thus enables H⁺ generated on the oxidation catalyst layer 19 side to migrate to the reduction catalyst layer 20 side, and hence CO₂ can be decomposed with the transferred H⁺ on the reduction catalyst layer 20 side. In this way, the present embodiment can realize high photoreaction efficiency.

The electrolytic bath flow channel 41 is then explained below in detail. The flow channel 41 is, for example, provided on the side of the electrolytic bath 31. One end of the channel 41 is connected to the oxidation electrolytic bath 31a and the other is connected to the reduction bath 31b. The flow channel 41 thus connects the oxidation bath 31a with the reduction bath 31b, and thereby it enables ions to move between the catalyst layers 19 and 20. In a part of the flow channel 41, ion-exchange membranes 43 are provided. The ion-exchange membranes 43 selectively allow particular ions to pass through, and thereby the electrolyte solution is separated and at the same time only the particular ions are transferred between the bathes 31a and 31b.

The ion-exchange membranes 43 are proton exchange ones, and can transfer H⁺ generated in the oxidation bath 31a to the reduction bath 31b. Examples of the proton exchange membranes include: cation exchange membranes, such as, Nafion and Flemion; and anion exchange membranes, such as, Neosepta and Selemion.

The ion-exchange membranes 43 may be replaced with, for example, a salt bridge made of a material, such as agar, capable of transferring ions and of separating the electrolyte solution. However, the proton exchange membranes of solid polymer, such as Nafion, generally can improve the ion mobility.

The flow channel 41 may be equipped with a circulation mechanism 42, such as, a pump. The circulation mechanism 42 promotes circulation of the electrolyte solution so as to enhance circulation of ions (H⁺) between the bathes 31a and 31b. There may be two electrolytic bath flow channels 41. In that case, the circulation mechanism 42 is installed in at least one channel. For example, ions are transferred with the mechanism 42 through one of the channels 41 from the oxidation bath 31a to the reduction bath 31b and through the other channel 14 from the reduction bath 31b to the oxidation bath 31a. The flow channel 41 may be equipped with two or more circulation mechanisms 42. Further, for the purposes of lowering diffusion of ions and thereby of circulating them efficiently, there may be a plural number (three or more) of flow channels 41.

Since making flow of the solution, the circulation mechanism 42 can prevent bubbles of generated gases from remaining on the surfaces of the electrodes and bathes and hence from scattering the sunlight to lower the efficiency and to change the light quantity distribution.

When irradiated with light, the surface of the multi-junction solar cell 17 may be heated to cause thermal difference in the electrolyte solution. The thermal difference can be utilized to cause convection by which ions are efficiently circulated. In this case, circulation of ions can be promoted more than diffusion thereof.

The flow channel 41 or the electrolytic bath 31 may be equipped with a thermostat mechanism 44 for controlling the electrolyte solution temperature. The thermostat 44 can adjust the temperature so as to control performances of the solar cell and the catalysts. For example, the reaction system can be made thermally homogeneous to improve and stabilize the performances of the solar cell and the catalysts. Further, the temperature can be prevented from rising to stabilize the system. Furthermore, the temperature can be so controlled as to change selectivity of the solar cell and the catalysts and thereby to control the reaction products.

The oxidation electrolytic bath 31a is filled with an electrolyte solution containing desired electrolytes. The oxidation catalyst layer 19 is immersed in the electrolyte solution. The electrolyte solution preferably promotes the oxidation reaction of $H_2O$, and is, for example, a liquid containing $H_2O$.

The reduction electrolytic bath 31b is filled with an electrolyte solution containing desired electrolytes. The reduction catalyst layer 20 is immersed in the electrolyte solution. It is preferred for the electrolyte solution to lower the reduction potential of $CO_2$, to have high ion conductivity and to contain a $CO_2$ absorber capable of absorbing $CO_2$. The electrolyte solution is, for example, a liquid containing $CO_2$. Examples of the electrolyte solution loaded in the reduction bath 31b include: an ionic liquid which consists of a cation such as imidazolium or pyridinium ion and an anion such as $BF_4^-$ or $PF_6^-$ and which can be in a liquid state in a wide temperature range; an amine solution such as ethanolamine, imidazole or pyridine solution; and an aqueous solution thereof. The amine may be either primary, secondary or tertiary. Examples of the primary amine include: methylamine, ethylamine, propylamine, butylamine, pentylamine, and hexylamine. In any of the primary, secondary and tertiary amine, the hydrocarbon group substituted with amine may be alcohol or may be substituted with halogens. Examples thereof include methanolamine, ethanolamine, and chloromethylamine. The hydrocarbon group substituted with amine may have an unsaturated bond.

Examples of the secondary amine include: dimethylamine, diethylamine, dipropylamine, dibutylamine, dipentylamine, dihexylamine, dimethanolamine, diethanolamine, dipropanolamine, methylethylamine, and methylpropylamine.

Examples of the tertiary amine include: trimethylamine, triethylamine, tripropylamine, tributylamine, trihexylamine, trimethanolamine, triethanolamine, tripropanolamine, tributanolamine, tripentanolamine, trihexanolamine, methyldiethylamine, and methyldipropylamine.

The ionic liquid can comprise a cation such as imidazolium or pyridinium ion. Examples of the imidazolium ion include: 1-ethyl-3-methylimidazolium ion, 1-methyl-3-propylimidazolium ion, 1-butyl-3-methylimidazole ion, 1-methyl-3-pentylimidazolium ion, and 1-hexyl-3-methyl-imidazolium ion. Those imidazolium ions may be substituted at the 2-position. Examples thereof include: 1-ethyl-2,3-dimethylimidazolium ion, 1,2-dimethyl-3-propylimidazolium ion, 1-butyl-2,3-dimethylimidazolium ion, 1,2-dimethyl-3-pentylimidazolium ion and 1-hexyl-2,3-dimethylimidazolium ion. Examples of the pyridinium ion include: methylpyridinium, ethylpyridinium, propylpyridinium, butylpyridinium, pentylpyridinium and hexylpyridinium ions. Those imidazolium and pyridinium ions may have substituents in place of alkyl groups and may contain unsaturated bonds.

Examples of the anion in the ionic liquid include: fluoride ion, chloride ion, bromide ion, iodide ion, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide and bis(perfluoroethylsulfonyl)imide. Further, it is possible to adopt a dipolar ion in which the cation and anion of ionic liquid are bound via a hydrocarbon.

The electrolyte solutions loaded in the oxidation and reduction baths 31a and 31b may have the same temperature or different temperatures according to the operating conditions. For example, if the electrolyte solution in the reduction bath 31b is an amine absorber solution containing $CO_2$ emitted from factories, the temperature of the solution is higher than room temperature, for example, 30 to 150° C. inclusive, preferably 40 to 120° C. inclusive.

The reduction catalyst 100 according to the first embodiment is employed as the reduction catalyst layer 20. When the reduction potential is applied to the electric conductor 102 in the reduction catalyst, particular ingredients such as $CO_2$-containing ions (e.g., hydrogen carbonate ions) and physically dissolved $CO_2$ molecules in the electrolyte solution are electrostatically attracted to near the conductor 102 and the nitrogen atom included in the organic modifying groups 112 fixed thereon. As a result, the conductor 102, the nitrogen atom and $CO_2$ cooperatively form a carbonate at the interface of catalyst/electrolyte solution. At the interface, the reduction of $CO_2$ proceeds according to the charge transfer reaction. In the reduction bath 31b, $CO_2$ is thus reduced by the reduction catalyst layer to generate carbon compounds. Specifically, $CO_2$ is reduced and converted into carbon monoxide (CO), formic acid (HCOOH), formic aldehyde (HCHO), methanol (CH3OH), acetic acid (CH3COOH), acetaldehyde (CH3CHO), ethanol (CH3CH2OH) and ethylene glycol (HOCH2CH2OH). As the side reaction, water (H2O) is also reduced to generate hydrogen (H2).

When carbon dioxide undergoes two-electron reduction, not only carbon monoxide but also formic acid is produced. If the formic acid further undergoes two-electron reduction, formic aldehyde is produced. Furthermore, when the formic aldehyde undergoes two-electron reduction, methanol is produced. Accordingly, for the purpose of producing methanol with the reduction catalyst 100, formic acid or formic aldehyde as well as carbon dioxide can be adopted as the stating material. Hence, the electrolyte solution in the reduction electrolytic bath 31b preferably absorbs and contains at least one material of reduction object selected from carbon dioxide, formic acid or formic aldehyde. The electrolyte solution in the reduction bath 31b is, for example, a solution of sodium hydrogen carbonate.

The two-electron reduction of carbon dioxide occasionally provides oxalic acid. When the oxalic acid further undergoes two-electron reduction, glyoxylic acid is produced. If the glyoxylic acid furthermore undergoes two-electron reduction, glyoxal or glycolic acid is produced. Still further, when the glyoxal or glycolic acid undergoes two-electron reduction, glycolaldehyde is produced. Still furthermore, when the glycolaldehyde undergoes two-electron reduction, ethylene glycol is produced. Accordingly, for the purpose of producing ethylene glycol with the reduction catalyst 100, oxalic acid or glyoxal as well as carbon dioxide can be adopted as the stating material. Hence, the electrolyte solution in the reduction electrolytic bath 31b may absorb and contain at least one material of reduction object selected from oxalic acid or glyoxal.

If carbon dioxide undergoes eight-electron reduction, acetic acid may be produced. When the acetic acid further undergoes eight-electron reduction, acetaldehyde is produced. Furthermore, when the acetaldehyde undergoes eight-electron reduction, ethanol is produced. Accordingly, for the purpose of producing ethanol with the reduction catalyst 100, acetic acid or acetaldehyde as well as carbon dioxide can be adopted as the stating material. Hence, the electrolyte solution in the reduction electrolytic bath 31b may absorb and contain at least one material of reduction object selected from carbon dioxide, acetic acid or acetaldehyde.

As described above, the reactions of $CO_2$ reduction to generate sets of formic acid, formic aldehyde and methanol, of oxalic acid, glyoxal and ethylene glycol, and of acetic acid, acetaldehyde and ethanol are dependent on density of the organic modifying groups 112 in the reduction catalyst 100. For example, if the modifying groups 112 have a density of $1 \times 10^{11}$ atoms/cm$^2$ or less on the electric conductor 102, the reduction mainly generates formic acid, formic aldehyde and methanol. On the other hand, if the modifying groups 112 have a density of $1 \times 10^{12}$ to $10^{15}$ atoms/cm$^2$, the reduction produces not only formic acid, formic aldehyde and methanol but also acetic acid, acetaldehyde and ethanol. Specifically, if the modifying groups 112 have a density of $1 \times 10^{13}$ to $10^{15}$ atoms/cm$^2$, the reduction mainly generates acetic acid, acetaldehyde and ethanol. As shown in Examples described later, those relations between the modifying molecule density and the products are found by the present inventors through their experiments and research.

The density and bonding state of the modifying groups 112 can be calculated on the basis of the results of analysis according to X-ray photoelectron spectroscopy (XPS). The conditions of the analysis may be as follows, in which "detection angle" means an angle between the normal to the sample surface and the input lens axis of the detector.

Adopted machine: Quantera-SXM ([trademark], manufactured by PHI Inc.)
Applied X-ray source: single crystal spectral AlKα line
Output power: 50 W
Analyzed range: ϕ 200 μm
Pass energy: Wide scan-280.0 eV (1.0 eV/step)
Narrow scan-69.0 eV (0.125 eV/step)
Detection angle: 45°
Charge neutralization flood gun: both Ar$^+$ and e$^-$ For the charge correction (energy-shift correction along the horizontal axis), the signal corresponding to C—C/H bond component in the C1s spectrum is adjusted to 284.80 eV.

The bonding density (molecule density) of the modifying groups 112 is calculated according to the following formula (6) in which the number of Au atoms per area is estimated according to the following formula (5) and in which the number of S atoms is normalized by the number of Au atoms obtained from the semi-quantitative analysis.

$$\text{number of Au atoms per area (atoms/cm}^2\text{)} = \text{density (g/cm}^3\text{)} \times \text{detection depth (nm)} \times N/M_w \quad (5)$$

$$\text{molecule density (atoms/cm}^2\text{)} = \text{Au (atoms/cm}^2\text{)} \times S/\text{Au (atomic ratio)} \quad (6)$$

The density, detection depth, N and Mw in the above are 19.3 g/cm$^3$, 5 nm, Avogadro number (atoms/mol) and 197 g/mol, respectively.

If the modifying groups 112 in the reduction catalyst 100 have a density of $1 \times 10^{13}$ to $10^{15}$ atoms/cm$^2$, carbon dioxide is reduced to generate ethylene glycol via oxalic acid or glyoxal. This reaction selectively proceeds under the condition where the electrode keeps the reduction potential. Specifically, since the electrode keeps the reduction potential, the modifying groups 112 are homogeneously oriented and consequently the reaction proceeds to produce ethylene glycol. In order that the electrode can thus keep the reduction potential in a three-pole cell in which the working electrode, reference electrode and counter electrode are the electrode substrate, a silver-silver chloride electrode and a Pt electrode, respectively, a voltage of −0.5 to −1.3 V is applied to the working electrode for preferably 5 hours or more, more preferably 3 hours or more, further preferably 1 hour or more. The orientation of the modifying groups 112 can be observed by means of a scanning tunneling microscope (STM).

Variations of the chemical reactor according to the present embodiment are explained below.

Figure 8:
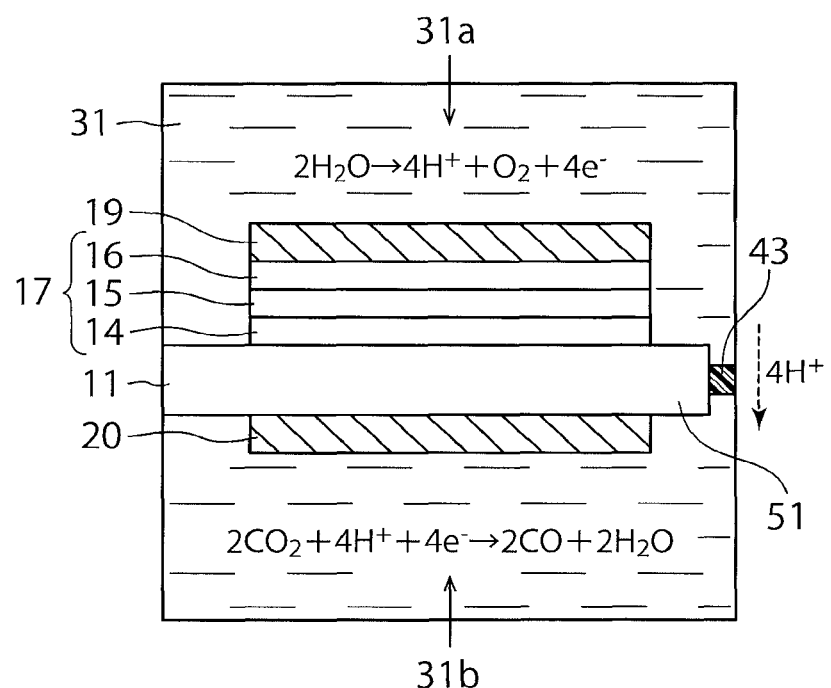
FIG. 8 is a schematic sectional view showing another structure of the photochemical reactor according to the embodiment.
Figure 9:
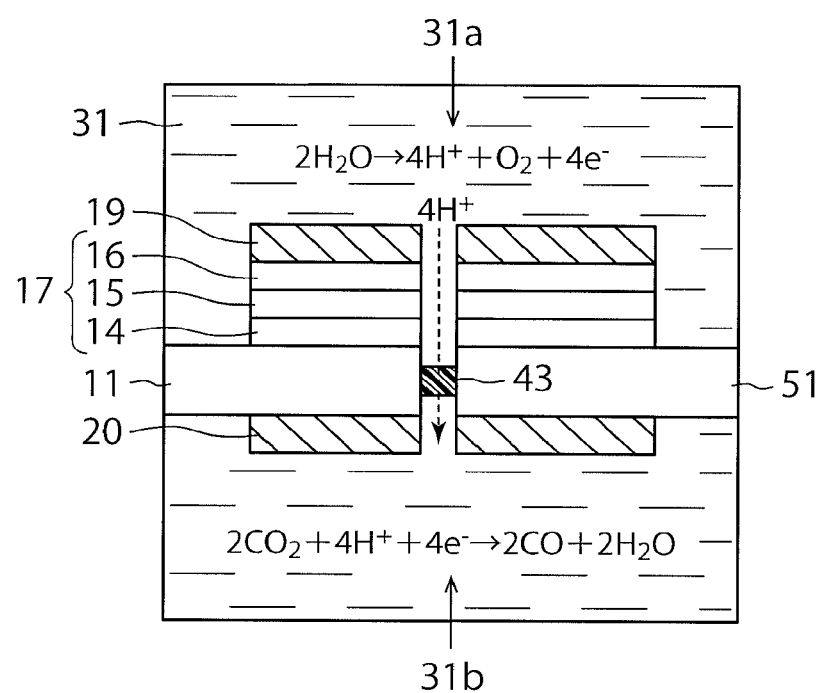
FIG. 9 is a schematic sectional view showing still another structure of the photochemical reactor according to the embodiment.

FIGS. 8 and 9 are schematic sectional views showing structures of the chemical reactors 210 and 220, respectively, according to the present embodiment. The structures explained below are different from the above-described structure of the reactor 200.

The chemical reactor 210 shown in FIG. 8 comprises a photochemical reaction cell 30, an electrolytic bath 31 containing the photochemical reaction cell 30, and an opening 51 penetrating the substrate 11 to serve as the ion migration path.

The opening 51 passes through the side edge of the substrate 11 from the oxidation electrolytic bath 31a side to the reduction electrolytic bath 31b side. In a part of the opening 51, ion-exchange membranes 43 are provided so that the oxidation and reduction baths 31a and 31b are separated with the substrate 11 and the ion-exchange membranes 43. The ion-exchange membranes 43 selectively allow particular ions to pass through, and thereby the electrolyte solution is separated but at the same time only the particular ions are transferred through the membranes 43 between the baths 31a and 31b.

The chemical reactor 220 shown in FIG. 9 comprises a photochemical reaction cell 30, an electrolytic bath 31 containing the photochemical reaction cell 30, and an opening 52 serving as the ion migration path. From the oxidation electrolytic bath 31a side to the reduction electrolytic bath 31b side, the opening 52 penetrates through a laminate of the reduction catalyst layer 20, the substrate 11, the multi-junction solar cell 17 and the oxidation catalyst layer 19.

In a part of the opening 52, ion-exchange membranes 43 are provided so that the oxidation and reduction baths 31a and 31b are separated with the substrate 11 and the ion-exchange membranes 43. The ion-exchange membranes 43 selectively allow particular ions to pass through, and thereby the electrolyte solution is separated but at the same time only the particular ions are transferred through the membranes 43 between the baths 31a and 31b. Although the reactor 220 shown in FIG. 9 comprises the ion-exchange membranes 43 only in a part of the opening 52, the opening 52 may be wholly filled with the membranes 43.

For the reasons described above, the present embodiment can provide a chemical reactor of high reaction efficiency.

EXAMPLES

Example 1

The reduction catalyst of Example 1 was produced by employing Au as the substrate surface (metal layer) and aminoethanethiol as the organic modifying molecule.

First, a stainless-steel substrate (150 mm×250 mm, thickness: 150 μm) was adopted as the current collector 101, on which Au was then sputtered to form a metal layer. The formed layer had a thickness even in planar direction, and the thickness was 100 nm.

The current collector thus provided with the metal layer was immersed for 48 hours in 10 mL of a 1 mM ethanol solution of aminoethanethiol, to fix the organic modifying molecules on the metal layer.

Example 2 to 15

The procedure of Example 1 was repeated except for employing the compounds shown in Table 1 as the modifying molecule, to produce reduction catalysts of Examples 2 to 15.

Comparative Example 1

The procedure of Example 1 was repeated except for not employing any modifying molecule, to produce a reduction catalyst of Comparative example 1.

Comparative Examples 2 and 3

The procedure of Example 1 was repeated except for employing the compound shown in Table 1 as the modifying molecule, to produce reduction catalysts of Examples 2 to 15. The used modifying molecule is represented by the formula (A), but the integer "na" in the formula is out of the range according the embodiment.

Examples 16 to 25

The procedure of Example 1 was repeated except that the metal layer was made of the materials shown in Table 2, to produce reduction catalysts of Examples 16 to 25.

Comparative examples 4 to 13

The procedure of Example 1 was repeated except that the metal layer was made of the materials shown in Table 2 and that the modifying molecule was not used, to produce reduction catalysts of Comparative examples 4 to 13.

[Production of Three-Pole Cells]

The reduction catalysts of Examples 1 to 25 and Comparative examples 1 to 13 were used to produce three-pole cells.

The reduction catalyst produced in each of Examples and Comparative examples was employed as the working electrode, and an Ag/AgCl electrode and a Pt electrode were adopted as the reference electrode and the counter electrode, respectively. They were installed in a H-shaped cell to produce a three-pole cell. The Pt electrode was placed in a cell bath separated with proton exchange membranes.

Independently, a 5% aqueous solution of $NaHCO_3$ was kept bubbled with 100% $CO_2$ gas until the solution absorbed $CO_2$ in the saturation concentration. For monitoring that, the $CO_2$ concentration was measured at the gas-inlet part and at the gas-outlet part to compare the measured values. When they reached the same values, it was judged that $CO_2$ dissolved in the aqueous solution reached the saturation concentration. The 5% $NaHCO_3$ aqueous solution thus prepared was adopted as both $CO_2$ absorber and electrolyte solution for $CO_2$ reduction in the three-pole cells.

The produced three-pole cells of Examples 1 to 25 and Comparative examples 1 to 13 were individually evaluated on the $CO_2$ reduction performance in the following manner.

In each three-pole cell, the current flowing between the working and counter electrodes was measured while constant-current electrolysis was carried out under the condition where the potential applied to the working electrode was kept −1.2 V based on Ag/AgCl. The electrolysis was continued for 1 hour and for 30 hours. During the measurement, the bath including the working electrode was kept bubbled with 100% $CO_2$ gas and simultaneously kept stirred at 750 rpm with a magnetic stirrer. The measurement was carried out by means of an electrochemical analyzer (Solartron cell test system [trademark], manufactured by Toyo Corporation).

Thereafter, reduction products formed by the constant-current electrolysis were analyzed. The products in the gaseous state, such as, hydrogen and carbon monoxide gases were analyzed by means of a gas chromatograph (Micro-GC CP4900 [trademark], manufactured by Varian Inc.). As for the products dissolved in the electrolyte solution, the analysis was carried out on formic acid, formic aldehyde, methanol, acetic acid, acetaldehyde, ethanol, oxalic acid, glyoxal and ethylene glycol.

The products of formic acid, acetic acid and oxalic acid were analyzed by means of an ion chromatograph (DX-320 [trademark], manufactured by Thermo Fisher Scientific Inc.), those of formic aldehyde, acetaldehyde and glyoxal were analyzed by means of a high performance liquid chromatograph (ACQUITY UPLC [trademark], manufactured by Waters Corporation), and those of methanol, ethanol and ethylene glycol were analyzed by means of a gas chromatograph (6890 [trademark], manufactured by Agilent Technologies, Inc.)

The faradaic efficiency was then calculated from the current consumed on the reduction reaction at the working electrode and from the quantitative analysis of the reduction product, and was represented by the ratio of the quantity of electricity consumed on generating the reduction product to that of inputted electricity. Each faradaic efficiency of individual reduction product was regarded as the selectivity thereof (%). The total faradaic efficiency of all the products was also calculated to obtain a $CO_2$ reduction ratio. The $CO_2$ reduction ratio is not 100% because the inputted electricity is partly consumed on the side reaction to generate hydrogen and also partly consumed as Joule heat.

In order to evaluate $CO_2$ reduction performance, the faradaic efficiency of all the $CO_2$ reduction reactions was measured after the 1 hour- and 30 hour-electrolysis and then the obtained values were compared to estimate a maintaining ratio of the electrode reactions.

Table 1 shows the $CO_2$ reduction performance of Examples 1 to 15 and Comparative example 1. In the same manner as described above, the reduction catalysts of Examples 16 to 25 and Comparative examples 4 to 13 were used as the reduction electrode to evaluate $CO_2$ reduction performance. The results were shown in Table 2, in which the result of Comparative example 1 was also shown for reference.

TABLE 1

| | substrate surface | organic modifying molecule | selectivity (%, 1 hour) | | | | |
|---|---|---|---|---|---|---|---|
| | | | carbon monoxide | formic acid | formic aldehyde | methanol | acetic acid |
| Ex. 1 | Au | aminoethanethiol | 1 | 1 | 1 | 1 | 1 |
| Ex. 2 | Au | aminopropanethiol | 1 | 1 | 1 | 1 | 1 |
| Ex. 3 | Au | aminobutanethiol | 1 | 1 | 1 | 1 | 1 |
| Ex. 4 | Au | methylaminoethanethiol | 1 | 1 | 1 | 1 | 1 |
| Ex. 5 | Au | isopropylethylaminoethanethiol | 1 | 1 | 1 | 1 | 1 |
| Ex. 6 | Au | dimethylaminoethanethiol | 2 | 1 | 1 | 1 | 1 |
| Ex. 7 | Au | diethylaminoethanethiol | 5 | 1 | 1 | 1 | 1 |
| Ex. 8 | Au | dibutylaminoethanethiol | 7 | 1 | 1 | 1 | 1 |
| Ex. 9 | Au | mercaptoethylimidazole | 1 | 1 | 1 | 1 | 2 |
| Ex. 10 | Au | mercaptopropylimidazole | 1 | 1 | 1 | 1 | 3 |
| Ex. 11 | Au | mercaptobutylimidazole | 1 | 1 | 1 | 1 | 1 |
| Ex. 12 | Au | mercaptoethyltriazole | 1 | 1 | 1 | 1 | 5 |
| Ex. 13 | Au | mercaptopropyltriazole | 1 | 1 | 1 | 3 | 1 |
| Ex. 14 | Au | mercaptobutyltriazole | 1 | 2 | 1 | 3 | 1 |
| Ex. 15 | Au | mercaptohexyltriazole | 1 | 3 | 1 | 3 | 1 |
| Com. 1 | Au | — | 30 | — | — | — | — |
| Com. 2 | Au | aminooctanethiol | 1 | 1 | 1 | 1 | 1 |
| Com. 3 | Au | aminodecanethiol | 1 | 1 | 1 | 1 | 1 |

| | selectivity (%, 1 hour) | | | | | total $CO_2$ reduction | $CO_2$ reduction reaction-maintaining ratio (%) |
|---|---|---|---|---|---|---|---|
| | acetaldehyde | ethanol | oxalic acid | glyoxal | ethylene glycol | | |
| Ex. 1 | 1 | 2 | 1 | 1 | 81 | 91 | 98 |
| Ex. 2 | 1 | 2 | 2 | 1 | 74 | 85 | 95 |
| Ex. 3 | 1 | 2 | 5 | 1 | 56 | 70 | 85 |
| Ex. 4 | 1 | 2 | 1 | 2 | 77 | 89 | 97 |
| Ex. 5 | 1 | 2 | 1 | 5 | 73 | 87 | 89 |
| Ex. 6 | 1 | 2 | 1 | 1 | 77 | 88 | 95 |
| Ex. 7 | 1 | 2 | 1 | 1 | 69 | 83 | 90 |
| Ex. 8 | 1 | 2 | 1 | 1 | 62 | 79 | 85 |
| Ex. 9 | 1 | 2 | 1 | 1 | 77 | 88 | 93 |
| Ex. 10 | 1 | 2 | 1 | 1 | 73 | 85 | 88 |
| Ex. 11 | 1 | 2 | 1 | 1 | 70 | 80 | 85 |
| Ex. 12 | 1 | 2 | 1 | 1 | 69 | 83 | 91 |
| Ex. 13 | 1 | 1 | 1 | 1 | 67 | 78 | 87 |
| Ex. 14 | 1 | 1 | 1 | 1 | 61 | 73 | 85 |
| Ex. 15 | 1 | 1 | 1 | 1 | 57 | 70 | 82 |
| Com. 1 | — | — | — | — | — | 30 | 30 |
| Com. 2 | 1 | 2 | 7 | 1 | 32 | 48 | 70 |
| Com. 3 | 1 | 2 | 10 | 1 | 20 | 31 | 55 |

TABLE 2

| | substrate surface | organic modifying molecule | selectivity (%, 1 hour) | | | | |
|---|---|---|---|---|---|---|---|
| | | | carbon monoxide | formic acid | formic aldehyde | methanol | acetic acid |
| Ex. 1 | Au | aminoethanethiol | 1 | 1 | 1 | 1 | 1 |
| Ex. 16 | Ag | aminoethanethiol | 1 | 1 | 1 | 1 | 1 |
| Ex. 17 | Cu | aminoethanethiol | 1 | 1 | 1 | 2 | 2 |
| Ex. 18 | Pt | aminoethanethiol | 1 | 1 | 1 | 1 | 1 |
| Ex. 19 | Zn | aminoethanethiol | 1 | 1 | 1 | 1 | 1 |
| Ex. 20 | Fe | aminoethanethiol | 1 | 1 | 1 | 1 | 1 |
| EX. 21 | Ti | aminoethanethiol | 1 | 1 | 1 | 1 | 1 |
| Ex. 22 | Sn | aminoethanethiol | 1 | 1 | 1 | 1 | 1 |
| Ex. 23 | In | aminoethanethiol | 1 | 1 | 1 | 1 | 1 |
| Ex. 24 | Bi | aminoethanethiol | 1 | 1 | 1 | 1 | 1 |
| Ex. 25 | Ni | aminoethanethiol | 1 | 1 | 1 | 1 | 1 |
| Com. 1 | Au | — | 30 | — | — | — | — |
| Com. 4 | Ag | — | 30 | — | — | — | — |
| Com. 5 | Cu | — | 20 | — | — | — | — |
| Com. 6 | Pt | — | — | — | — | — | — |
| Com. 7 | Zn | — | 10 | — | — | — | — |
| Com. 8 | Fe | — | — | — | — | — | — |
| Com. 9 | Ti | — | — | — | — | — | — |
| Com. 10 | Sn | — | — | — | — | — | — |
| Com. 11 | In | — | — | — | — | — | — |

TABLE 2-continued

| | | | | | | | |
|---|---|---|---|---|---|---|---|
| Com. 12 | Bi | — | | 10 | — | — | — | — | — |
| Com. 13 | Ni | — | | — | — | — | — | — | — |

| | selectivity (%, 1 hour) | | | | | $CO_2$ reduction |
|---|---|---|---|---|---|---|
| | acetaldehyde | ethanol | oxalic acid | glyoxal | ethylene glycol | total $CO_2$ reduction | reaction-maintaining ratio (%) |
| Ex. 1 | 1 | 2 | 1 | 1 | 81 | 91 | 98 |
| Ex. 16 | 1 | 2 | 1 | 1 | 79 | 89 | 98 |
| Ex. 17 | 1 | 2 | 1 | 1 | 74 | 86 | 98 |
| Ex. 18 | 1 | 2 | 1 | 1 | 75 | 85 | 97 |
| Ex. 19 | 1 | 2 | 1 | 1 | 80 | 90 | 98 |
| Ex. 20 | 1 | 2 | 1 | 1 | 77 | 87 | 97 |
| EX. 21 | 1 | 2 | 1 | 1 | 76 | 86 | 97 |
| Ex. 22 | 1 | 2 | 1 | 1 | 79 | 89 | 98 |
| Ex. 23 | 1 | 2 | 1 | 1 | 72 | 82 | 96 |
| Ex. 24 | 1 | 2 | 1 | 1 | 73 | 83 | 98 |
| Ex. 25 | 1 | 2 | 1 | 1 | 71 | 81 | 97 |
| Com. 1 | — | — | — | — | — | 30 | 30 |
| Com. 4 | — | — | — | — | — | 30 | 25 |
| Com. 5 | — | — | — | — | — | 20 | 10 |
| Com. 6 | — | — | — | — | — | — | — |
| Com. 7 | — | — | — | — | — | 10 | 5 |
| Com. 8 | — | — | — | — | — | — | — |
| Com. 9 | — | — | — | — | — | — | — |
| Com. 10 | — | — | — | — | — | — | — |
| Com. 11 | — | — | — | — | — | — | — |
| Com. 12 | — | — | — | — | — | 10 | 5 |
| Com. 13 | — | — | — | — | — | — | — |

Examples 1 to 25 showed very high values of the $CO_2$ reduction and of the reaction-maintaining ratio. Further, in Examples 1 to 25, ethylene glycol was produced in very high selectivity. That is thought to be because the terminal amino groups in the modifying molecules not only promote the $CO_2$ reduction reaction but also contribute toward improvement of the ethylene glycol selectivity. Examples individually exhibited high reduction efficiencies and high reduction reaction-maintaining ratios, as compared with Comparative examples 2 and 3. Those Comparative examples adopted modifying molecules of such large "na" integers that the basic terminals were placed at a long distance from the substrate. The reason why the $CO_2$ reduction in Examples could stably keep proceeding for as long as 30 hours is thought to be because the basic terminals of the modifying molecules were so near to the substrate that resistance to the reduction current could be enough lowered to inhibit the side reactions.

In Comparative examples 1 and 4 to 11, the reduction electrode was not provided with the modifying molecules. Comparative examples 1, 4, 5, 7 and 12 showed very poor $CO_2$ reduction performance. In Comparative examples 6, 8 to 11, and 13, the reduction electrode was not provided with the modifying molecules and the metal layer was made of Pt, Fe, Ti, Sn, In or Ni. Comparative examples 6, 8 to 11, and 13 failed to reduce $CO_2$.

Example 26

The reduction catalyst of Example 26 was produced by employing Au as the substrate surface (metal layer), mercaptoethylimidazole as both spacer molecule and modifying molecule, and Au particles having a mean size of 3 nm as the metal fine particles. The mean size of the fine particles was measured by means of a particle size analyzer (Zetasizer Nano ZS [trademark], manufactured by Malvern Instruments Ltd.).

First, a stainless-steel substrate (150 mm×250 mm, thickness: 150 µm) was adopted as the current collector, on which Au was then sputtered to form a metal layer. The formed layer had a thickness even in planar direction, and the thickness was 100 nm.

The current collector thus provided with the metal layer was immersed for 48 hours in 10 mL of a 1 mM ethanol solution of mercaptoethylimidazole, to fix the organic spacer molecules on the metal layer and thereby to form an organic spacer molecule layer. Subsequently, the collector provided with the spacer layer was immersed for 12 hours in an aqueous solution in which the metal fine particles were dispersed, to fix the metal fine particles on the spacer layer. The collector loaded with the metal particles was then immersed for 48 hours in 10 mL of a 1 mM ethanol solution of mercaptoethylimidazole, to fix the modifying molecules on the metal fine particles. Thereafter, those procedures for fixing the metal fine particles and for fixing the modifying molecules were repeated 10 times to increase the amount of the fixed particles. The reduction catalyst thus prepared was used as the reduction electrode and 5% $NaHCO_3$ aqueous solution was adopted as both $CO_2$ absorber and electrolyte solution for $CO_2$ reduction, to produce a three-pole cell in the same manner as described above.

Example 27

The procedure of Example 26 was repeated except for adopting a triethanolamine aqueous solution (50 wt % aqueous solution, $CO_2$-saturatation absorber), to produce a three-pole cell.

Example 28

The procedure of Example 26 was repeated except for adopting a 90% 1-ethyl-3-methylimidazolium tetrafluoroborate aqueous solution (EMIBFb 4, $CO_2$-saturatation absorber), to produce a three-pole cell.

Comparative Example 15

The procedure of Comparative example 1 was repeated to prepare a reduction catalyst not comprising any of the spacer molecules, the metal fine particles and the modifying molecules. The prepared catalyst and a triethanolamine aqueous solution (50 wt % aqueous solution, $CO_2$-saturatation absorber) were used to produce a three-pole cell in the same manner as that in Example 26.

Comparative Example 16

The procedure of Comparative example 1 was repeated to prepare a reduction catalyst not comprising any of the spacer molecules, the metal fine particles and the modifying molecules. The prepared catalyst and a 90% 1-ethyl-3-methylimidazolium tetrafluoroborate aqueous solution (EMIBF4, $CO_2$-saturatation absorber) were used to produce a three-pole cell in the same manner as that in Example 26.

[Evaluation of $CO_2$ Reduction Performance]

The three-pole cells of Examples 26 to 28 and Comparative examples 15 and 16 were individually evaluated on the $CO_2$ reduction performance in the same manner as described above. The results were shown in Table 3, in which the result of Comparative example 1 was also shown for reference.

electrolyte solution may be any of the ethylene glycol aqueous solution, amine aqueous solution and ionic liquid, and it also indicates that very efficient $CO_2$ reduction can proceed with high selectivity in any electrolyte solution. From the result of Example 28, it was found that the electrolyte solution of ionic liquid realizes particularly efficient $CO_2$ reduction.

Example 29

The procedure of Example 26 was repeated except for adopting a multi-junction solar cell substrate as the collector and mercaptoethyltriazole as both spacer molecule and modifying molecule, to produce a reduction catalyst. On the oxidation electrode layer in the multi-junction solar cell, an oxidation catalyst layer was formed. Specifically, the oxidation electrode layer was sprayed with a dispersion in which nanoparticles of nickel oxide were dispersed in an alcohol aqueous solution, to produce a photochemical reaction cell of Example 26. The cell was cut into a size of 150 mm×250 mm.

Comparative Example 17

The procedure of Comparative example 1 was repeated except for adopting a multi-junction solar cell substrate as the collector, to prepare a reduction catalyst not comprising any of the spacer molecules, the metal fine particles and the

TABLE 3

| | substrate surface | organic modifying molecule/ spacer organic molecule | mean size of Au fine particles (nm) | electrolyte solution | selectivity (%) | | | |
|---|---|---|---|---|---|---|---|---|
| | | | | | carbon monoxide | formic acid | formic aldehyde | methanol |
| Ex. 26 | Au | mercaptoethyl imidazole | 3 | 5% $NaHCO_3$ aqueous solution | 1 | 1 | 1 | 1 |
| Ex. 27 | Au | mercaptoethyl imidazole | 3 | 50% TEA aqueous solution | 3 | 1 | 1 | 1 |
| Ex. 28 | Au | mercaptoethyl imidazole | 3 | 90% EMIBF4 aqueous solution | 5 | 1 | 1 | 3 |
| Com. 1 | Au | — | — | 5% $NaHCO_3$ aqueous solution | 30 | — | — | — |
| Com. 15 | Au | — | — | 50% TEA aqueous solution | 40 | — | — | — |
| Com. 16 | Au | — | — | 90% EMIBF4 aqueous solution | 40 | — | — | — |

| | selectivity (%) | | | | | | |
|---|---|---|---|---|---|---|---|
| | acetic acid | acetaldehyde | ethanol | oxalic acid | glyoxal | ethylene glycol | total $CO_2$ reduction |
| Ex. 26 | 2 | 1 | 2 | 1 | 1 | 82 | 93 |
| Ex. 27 | 2 | 1 | 2 | 1 | 1 | 77 | 90 |
| Ex. 28 | 2 | 1 | 2 | 1 | 1 | 77 | 96 |
| Com. 1 | — | — | — | — | — | — | 30 |
| Com. 15 | — | — | — | — | — | — | 35 |
| Com. 16 | — | — | — | — | — | — | 38 |

50% TEA aqueous solution: 50% triethanolamine aqueous solution
90% EMIBF4 aqueous solution: 1-ethyl-3-methylimidazolium tetrafluoroborate aqueous solution Examples 26 to 28 showed very high values of the $CO_2$ reduction. Further, in Examples 26 to 28, ethylene glycol was produced in very high selectivity. This indicates that the modifying molecules. On the oxidation electrode layer in the multi-junction solar cell, an oxidation catalyst layer was formed. Specifically, the oxidation electrode layer was sprayed with a dispersion in which nanoparticles of nickel oxide were dispersed in an alcohol aqueous solution, to produce a photochemical reaction cell of Comparative example 15. The cell was cut into a size of 150 mm×250 mm.

[Evaluation of Energy Conversion Efficiency]

The photochemical reaction cells of Example 29 and Comparative example 17 were individually installed in chemical reactors and evaluated on the energy conversion efficiency. The oxidation-side and reduction-side electrolyte solutions were a 0.5 M potassium hydroxide (KOH) aqueous solution and a triethanolamine aqueous solution (50 wt % aqueous solution, $CO_2$-saturatation absorber), respectively. As the ion-exchange membranes, proton exchange ones were used. The oxidation catalyst layer side of each reactor was exposed to light of AM1.5 (100 mW/cm$^2$) from a solar simulator, and CO gas generated on the reduction side and all the other $CO_2$ reduction products were quantitatively analyzed with a gas chromatograph and the like in the same manner as those in Example 1. From the results, values of energy conversion efficiency were calculated according to the following formula (7): FE/SE×100 (7).

In the formula (7), SE is the energy of applied sunlight and FE is Gibbs free energy of the products. The results are shown in Table 4.

TABLE 4

| | substrate surface | organic modifying molecule/ spacer organic molecule | mean size of Au fine particles (nm) | electrolyte solution | energy conversion efficiency (%) |
|---|---|---|---|---|---|
| Ex. 29 | Au | mercaptoethyl triazole | 3 | 50% TEA aqueous solution | 0.05 |
| Com. 17 | Au | — | — | 50% TEA aqueous solution | 0.01 |

The energy conversion efficiency in Comparative example 15 was 0.01% while that in Example 29 was 0.05%. This indicates that, if conducted by use of the reduction catalyst comprising the organic modifying molecules, the reduction reaction is driven by lower energy to improve the energy conversion efficiency.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the invention.

The invention claimed is:

1. A reduction catalyst, comprising:
   an electric conductor; and
   an organic layer having organic modifying groups placed on the surface of the conductor,
   wherein:
   the organic modifying groups have a structure represented by the following formula (B):

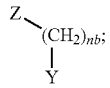

Z is an imidazole group or a triazole group;
Y is a heteroatom-containing group capable of linking to the electric conductor;
nb is an integer of 0 to 6 inclusive; and
the organic modifying groups have a density of $1×10^{12}$ to $10^{15}$ atoms/cm$^2$.

2. The reduction catalyst according to claim 1, wherein Y is —S—.

3. The reduction catalyst according to claim 1, wherein the organic modifying groups are derived from organic compounds selected from the group consisting of mercaptoethylimidazole, mercaptopropylimidazole, mercaptobutylimidazole, mercaptohexylimidazole, mercaptotriazole, mercaptoethyltriazole, mercaptopropyltriazole, mercaptobutyltriazole, and mercaptohexyltriazole.

4. The reduction catalyst according to claim 1, wherein the electric conductor comprises a metal selected from the group consisting of: Au, Ag, Cu, Pt, Pd, Zn, Fe, Ti, Sn, In, Hg, Bi and Ni.

5. The reduction catalyst according to claim 1, wherein Y is selected from the group consisting of —S—, —S=S— and —N=C=S—.

6. The reduction catalyst according to claim 1, wherein the organic modifying groups have a density of $1×10^{13}$ to $10^{15}$ atoms/cm$^2$.

7. A reduction catalyst, comprising:
   an electric conductor; and
   an organic layer having organic modifying groups placed on the surface of the conductor,
   wherein:
   the organic modifying groups have a structure represented by the following formula (A) or (B):

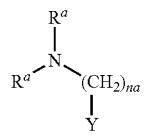

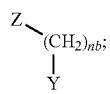

each Ra is independently H or an alkyl group of $C_1$ to $C_4$;
Z is an aromatic ring having two or more nitrogen atoms which are non-cationic nitrogen atoms;
Y is a heteroatom-containing group capable of linking to the electric conductor;
na is an integer of 1 to 5 inclusive; and
nb is an integer of 0 to 6 inclusive,
wherein:
the electric conductor is in the form of metal fine particles; and
the metal particles are loaded on a spacer layer that is made of an organic material and formed on another electric conductor on a current collector.

8. A reduction catalyst, comprising:
an electric conductor; and
an organic layer having organic modifying groups placed on the surface of the conductor,
wherein:
the organic modifying groups have a structure represented by the following formula (A) or (B):

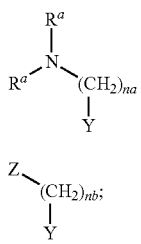

each Ra is independently H or an alkyl group of $C_1$ to $C_4$;
Z is an aromatic ring having two or more nitrogen atoms which are non-cationic nitrogen atoms;
Y is a heteroatom-containing group capable of linking to the electric conductor;
na is an integer of 1 to 5 inclusive;
nb is an integer of 0 to 6 inclusive; and
the organic modifying groups have a density of $1\times10^{12}$ to $10^{15}$ atoms/cm$^2$; and
wherein the electric conductor comprises a metal oxide selected from the group consisting of $Ag_2O$, CuO, $Ta_2O_5$, $TiO_2$, $ZrO_2$, $Al_2O_3$, $SiO_2$, ZnO, ITO, and FTO.

9. A chemical reactor comprising:
an oxidation electrode;
a reduction electrode provided with a reduction catalyst; and
a power supply unit connected to the oxidation electrode and the reduction electrode,
wherein said reduction catalyst comprises:
an electric conductor; and
an organic layer having organic modifying groups placed on the surface of the conductor,
wherein:
the organic modifying groups have a structure represented by the following formula (A) or (B):

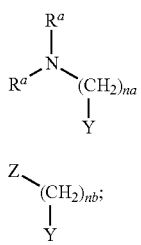

each Ra is independently H or an alkyl group of $C_1$ to $C_4$;
Z is an aromatic ting having two or more nitrogen atoms which are non-cationic nitrogen atoms;
Y is a heteroatom-containing group capable of linking to the electric conductor;
na is an integer of 1 to 5 inclusive; and
nb is an integer of 0 to 6 inclusive.

10. The chemical reactor according to claim 9, wherein the power supply unit comprises a semiconductor layer in which charge separation is caused by light energy.

11. The chemical reactor according to claim 10, wherein the semiconductor layer is placed between the oxidation electrode and the reduction electrode.

12. A reduction method, comprising:
contacting an electrolyte solution with a reduction electrode provided with a reduction catalyst comprising an electric conductor and an organic layer having organic modifying groups placed on the surface of the conductor; and then introducing a low molecular weight-carbon compound into the electrolyte solution so as to reduce the low molecular weight-carbon compound by the action of the electrode,
wherein:
the organic modifying groups have a structure represented by the following formula (A) or (B):

each Ra is independently H or an alkyl group of $C_1$ to $C_4$;
Z is an aromatic ring having two or more nitrogen atoms which are non-cationic nitrogen atoms;
Y is a heteroatom-containing group capable of linking to the electric conductor;
na is an integer of 1 to 5 inclusive;
b is an integer of 0 to 6 inclusive; and
the organic modifying groups have a density of $1\times10^{12}$ to $10^{15}$ atoms/cm$^2$.

13. The reduction method according to claim 12, wherein the low molecular weight-carbon compound is selected from the group consisting of carbon dioxide, oxalic acid, and glyoxal.

14. A reduction product-producing system, comprising:
a chemical reactor comprising an oxidation electrolytic bath provided with an oxidation catalyst and a reduction electrolytic bath provided with a reduction catalyst an electric conductor and an organic layer having organic modifying groups placed on the surface of the conductor, so as to produce a reduction product by a reduction reaction of carbon dioxide;
an electrolyte solution supply unit by which an electrolyte solution is supplied to the reduction electrolytic bath;
a carbon dioxide supply unit by which carbon dioxide is dissolved in the electrolyte solution so as to keep the reduction reaction in the reduction electrolytic bath and thereby to increase the concentration of the reduction product in the electrolyte solution; and
a separation unit by which the reduction product is separated from the electrolyte solution where the concentration of the electrolyte is increased by the carbon dioxide supply unit,
wherein:
the organic modifying groups have a structure represented by the following formula (A) or (B):

each Ra is independently H or an alkyl group of $C_1$ to $C_4$;
Z is an aromatic ring having two or more nitrogen atoms which are non-cationic nitrogen atoms;
Y is a heteroatom-containing group capable of linking to the electric conductor;
na is an integer of 1 to 5 inclusive;
nb is an integer of 0 to 6 inclusive; and
the organic modifying groups have a density of $1\times10^{12}$ to $10^{15}$ atoms/cm$^2$.

\* \* \* \* \*